United States Patent
Silva et al.

(10) Patent No.: US 12,216,710 B2
(45) Date of Patent: Feb. 4, 2025

(54) GRAPH SEARCH AND VISUALIZATION FOR FRAUDULENT TRANSACTION ANALYSIS

(71) Applicant: Feedzai-Consultadoria e Inovação Tecnológica, S.A., Coimbra (PT)

(72) Inventors: Maria Inês Silva, Lisbon (PT); Bernardo José Amaral Nunes de Almeida Branco, Lisbon (PT); Pedro Gustavo Santos Rodrigues Bizarro, Lisbon (PT); João Tiago Barriga Negra Ascensão, Lisbon (PT); Saurabh Bajaj, San Mateo, CA (US); Maria Beatriz Malveiro Jorge, Lisbon (PT); Sandro Daniel Sabudin Nunes, Lisbon (PT); Rodolfo Cristóvão, Lisbon (PT); Joel Carvalhais, Leiria (PT)

(73) Assignee: Feedzai—Consultadoria e Inovação Tecnológica, S.A. (PT)

( * ) Notice: Subject to any disclaimer, the term of this patent is extended or adjusted under 35 U.S.C. 154(b) by 396 days.

(21) Appl. No.: 17/080,660

(22) Filed: Oct. 26, 2020

(65) Prior Publication Data
US 2021/0124780 A1  Apr. 29, 2021

Related U.S. Application Data

(60) Provisional application No. 62/927,041, filed on Oct. 28, 2019.

(51) Int. Cl.
*G06F 16/90* (2019.01)
*G06F 16/901* (2019.01)
(Continued)

(52) U.S. Cl.
CPC ........ *G06F 16/9024* (2019.01); *G06F 18/214* (2023.01); *G06F 18/217* (2023.01);
(Continued)

(58) Field of Classification Search
CPC .. G06F 16/9024; G06F 18/214; G06F 18/217; G06F 18/22; G06F 18/24147; G06F 18/29
(Continued)

(56) References Cited

U.S. PATENT DOCUMENTS 8,561,184 B1 * 10/2013 Marsa .................... H04L 41/22
726/22
10,460,320 B1 * 10/2019 Cao ......................... G06N 20/10
(Continued)

*Primary Examiner* — Hicham Skhoun
(74) *Attorney, Agent, or Firm* — Van Pelt, Yi & James LLP

(57) ABSTRACT

In an embodiment, a process for graph search and visualization includes receiving a query graph, and calculating one or more vectors for the query graph, where the one or more vectors each identifies a corresponding portion of the query graph. The process includes identifying one or more graphs similar to the query graph including by comparing the calculated one or more vectors for the query graph with one or more previously-calculated vectors for a different set of graphs and outputting the identified one or more similar graphs. The comparison with the previously-calculated vector(s) may be based on previously-calculated vector(s) processed by grouping the one or more vectors into at least one group of vectors, identifying a representative graph for each of the at least one group of vectors; and storing the at least one group of vectors and a respective identified representative graph.

12 Claims, 22 Drawing Sheets

(51) Int. Cl.
*G06F 18/20* (2023.01)
*G06F 18/21* (2023.01)
*G06F 18/214* (2023.01)
*G06F 18/22* (2023.01)
*G06F 18/2413* (2023.01)

(52) U.S. Cl.
CPC ........ *G06F 18/22* (2023.01); *G06F 18/24147* (2023.01); *G06F 18/29* (2023.01)

(58) Field of Classification Search
USPC ......................................................... 707/798
See application file for complete search history.

(56) References Cited

U.S. PATENT DOCUMENTS

| | | | | |
|---|---|---|---|---|
| 2011/0295845 A1* | 12/2011 | Gao | ...................... | G06F 16/951 707/723 |
| 2012/0259850 A1 | 10/2012 | Liu | | |
| 2014/0278517 A1* | 9/2014 | Patel | .................. | G06Q 10/0637 705/2 |
| 2017/0124645 A1* | 5/2017 | Kortina | .................. | G06Q 40/03 |
| 2017/0220587 A1* | 8/2017 | Srinivasan | ............ | G06F 40/106 |
| 2018/0315229 A1* | 11/2018 | Kim | ......................... | G06F 17/16 |
| 2019/0005049 A1* | 1/2019 | Mittal | .................... | G06F 16/316 |
| 2019/0132344 A1* | 5/2019 | Lem | ...................... | G06N 20/00 |
| 2019/0179752 A1* | 6/2019 | Yoo | ...................... | G06F 12/0891 |
| 2019/0259033 A1 | 8/2019 | Surendra | | |
| 2019/0286943 A1* | 9/2019 | Leskovec | ................ | G06F 18/29 |
| 2019/0311367 A1* | 10/2019 | Reddy | ................ | G06Q 20/4016 |
| 2020/0092166 A1* | 3/2020 | Sharma | ................ | H04L 63/102 |
| 2020/0099708 A1* | 3/2020 | Mathews | .............. | H04L 41/145 |
| 2020/0151216 A1* | 5/2020 | Sevenich | ............... | G06F 16/2219 |
| 2020/0177616 A1* | 6/2020 | Hadar | ................. | H04L 63/1433 |
| 2020/0334495 A1* | 10/2020 | Al-Rfou | ............... | G06N 3/084 |
| 2020/0394707 A1* | 12/2020 | Guo | ........................ | G06Q 40/00 |
| 2020/0401696 A1* | 12/2020 | Ringlein | ............... | G06F 21/552 |
| 2020/0410002 A1* | 12/2020 | Rossi | ..................... | G06F 17/10 |
| 2021/0064751 A1* | 3/2021 | Li | ........................ | G06F 18/2413 |

\* cited by examiner

FIG. 11

GRAPH SEARCH AND VISUALIZATION FOR FRAUDULENT TRANSACTION ANALYSIS

CROSS REFERENCE TO OTHER APPLICATIONS

This application claims priority to U.S. Provisional Patent Application No. 62/927,041 entitled GRAPH VISUALIZATION FOR FRAUDULENT TRANSACTION ANALYSIS filed Oct. 28, 2019 which is incorporated herein by reference for all purposes.

BACKGROUND OF THE INVENTION

Graphs are useful for visualizing and analyzing data, and can help navigate large datasets. For example, graphs can be used to visualize entities and parameters associated with transactions for detecting security attacks and fraud. However, it is challenging to explore and search graphs that represent large datasets because conventional searching techniques are typically slow and do not efficiently identify similarities between graphs or patterns within a graph.

BRIEF DESCRIPTION OF THE DRAWINGS

Various embodiments of the invention are disclosed in the following detailed description and the accompanying drawings.

FIG. 11 shows an example of a graphical user interface for displaying graphs within a case manager tool.

DETAILED DESCRIPTION

Figure 1:
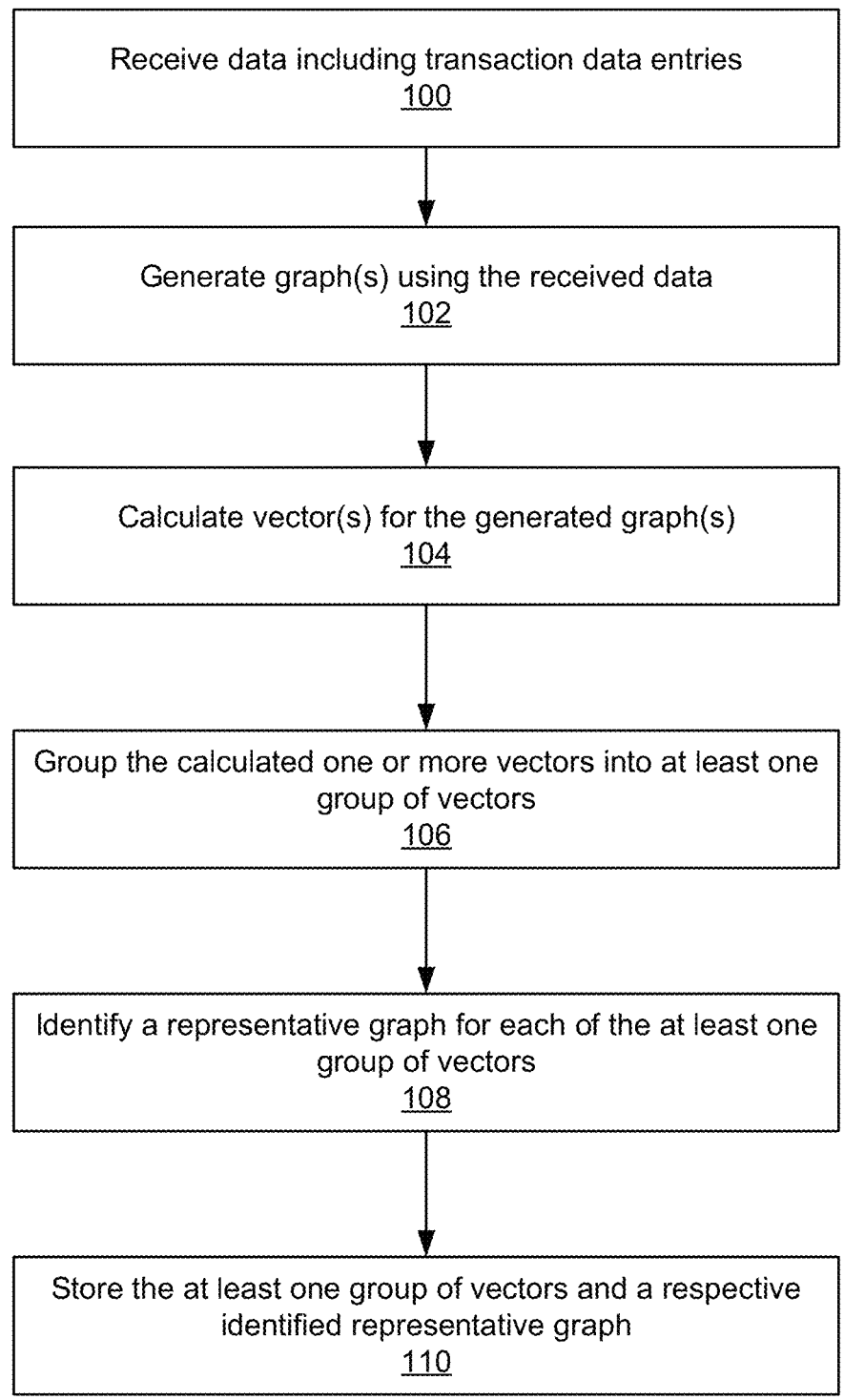
FIG. 1 is a flow chart illustrating an embodiment of a process for graph search and visualization.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

Embodiments of the disclosed graph search and visualization techniques generate graphs from non-graphical data, identify portions of interest within a generated graph and/or between graphs, and provide a tool to efficiently search and explore graphs. The disclosed techniques leverage graph embedding to speed graph similarity queries, while also providing a full system for querying and exploring the results. The disclosed techniques also provide a user interface to allow the user to explore and compare search results. For example, they help users to explore graphs including those that are big and complex. Although chiefly described using the example of fraud detection, this is not intended to be limiting and the graph search and visualization techniques can be used for any graph analysis.

In a fraud detection context, a fraud analyst can use a graph search and visualization system implemented using the disclosed techniques to investigate transaction networks. By identifying and highlighting meaningful connections between transactions and entities such as cards and emails, the graph search and visualization system helps analysts to review fraud cases and identify fraud patterns even where a dataset is large or complex. In this regard, the graph search and visualization system guides users in the exploration of fraud patterns within transaction networks. In one aspect, the disclosed techniques provide a system that efficiently searches through graph patterns and aids users in investigating fraud cases and reviewing transactions. In another aspect, the disclosed techniques provide insights into a graph that can be used by other system components (not necessarily an analyst) to identify fraud.

Conventional techniques for searching for similar graphs in a database given a query graph (commonly known as the top-k graph similarity problem) are typically not as effective or efficient as the disclosed techniques because they require more processing cycles or resources and might not identify the most relevant graph patterns. Typically the top-k similarity problem is addressed by using traditional graph similarity measures such as the Graph Edit Distance (GED) or the distances based on the Maximal Common Subgraph (MCS). Although inherently interpretable, these metrics are NP-hard, making their computation unsuitable for real-world networks, which tend to be larger and more complex. Even those conventional methods that seek to improve processing speed by deriving an upper and lower bound for the distance between graphs to prune candidates and discard unqualified graphs are insufficient for large datasets often seen in the fraud context where the amount of similarity queries can be on the order of 10 million queries (around 100,000 graphs are compared resulting in 10 million comparisons). Some techniques extract features from these graphs through hand-crafted metrics based on graph topology. However, these techniques might not be appropriate for transaction datasets since they do not take into account different node types and other relevant attributes such as amount or the time of transactions.

Comparing networks includes comparing their properties which can be topological or, in the case of multivariate networks, also node and edge attributes. Conventional techniques typically do not address the problem of visual network comparison. Conventional methods for dynamic networks that display differences and similarities in a network at different steps in sequence such as those based on animations, small multiples, and hybrids typically cannot be directly applied to comparisons between an input network and its top-k similar graphs, as the assumption of a dynamic sequence in the set does not exist. In addition, conventional approaches typically focus on topological comparison, and not on node attribute comparison, which makes them unsuitable for the fraud domain.

One of the advantages of the disclosed techniques is that the combination of graph embedding and clustering is more efficient than the conventional methods discussed herein. Graph embedding and clustering using the processes and systems more fully described below results in a highly scalable and low latency solution for graph searching and exploration. Embodiments of the present disclosure provide a full pipeline to run queries, visualize the results, and provide recommendations based on historical patterns. Thus, the disclosed graph search and visualization techniques are able to handle transaction data such as in fraud detection contexts where conventional methods typically cannot.

Figure 5:
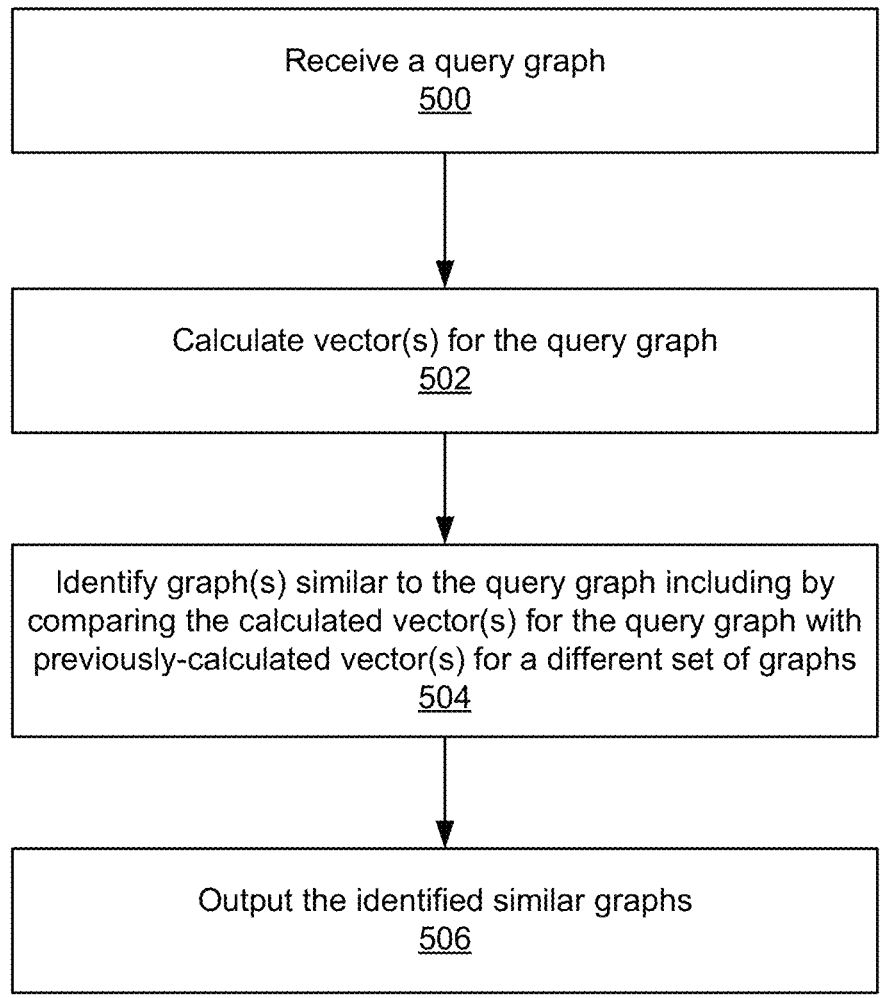
FIG. 5 is a flow chart illustrating an embodiment of a process for finding graphs similar to a query graph.
Figure 6:
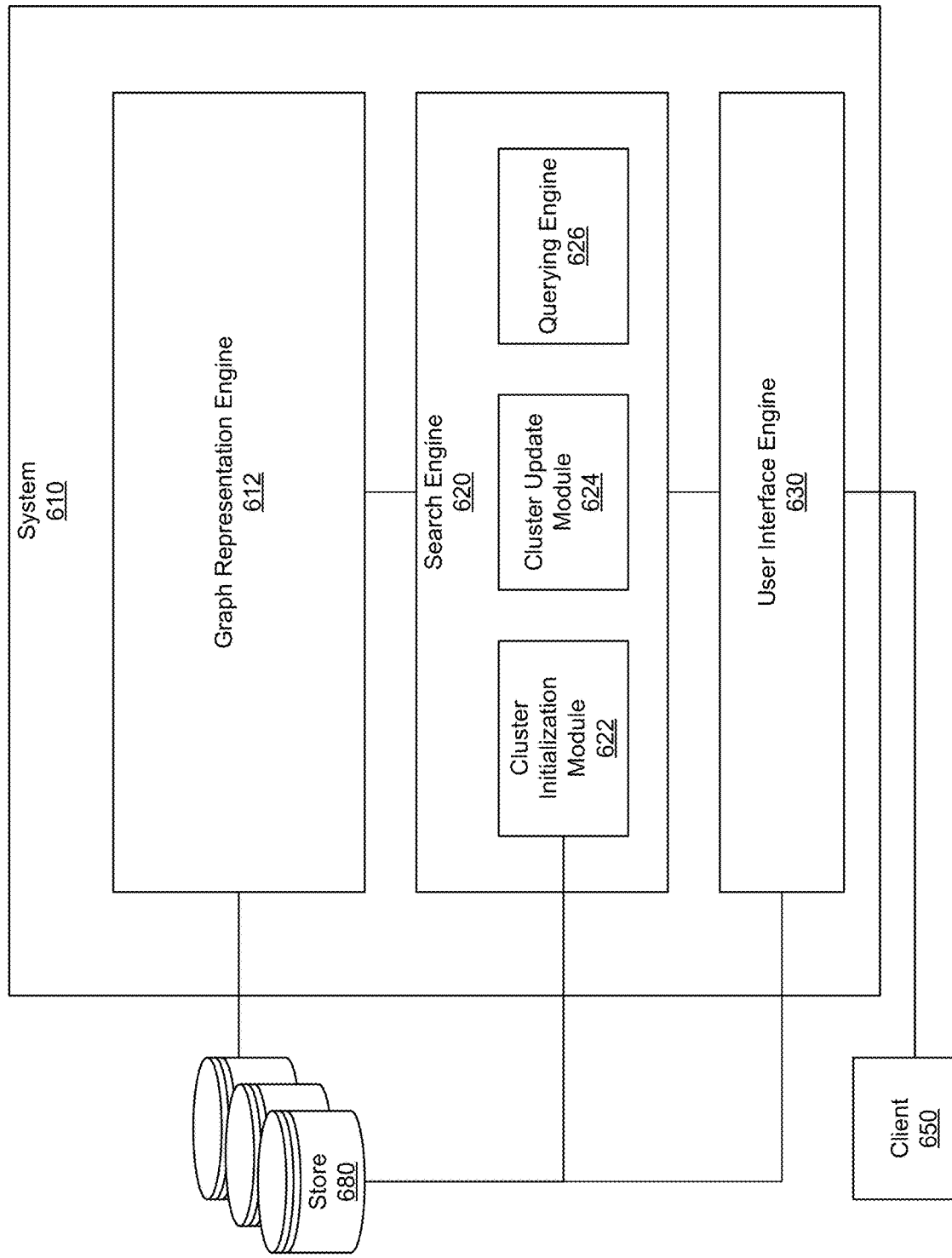
FIG. 6 is a block diagram illustrating an embodiment of a system for graph search and visualization.
Figure 12:
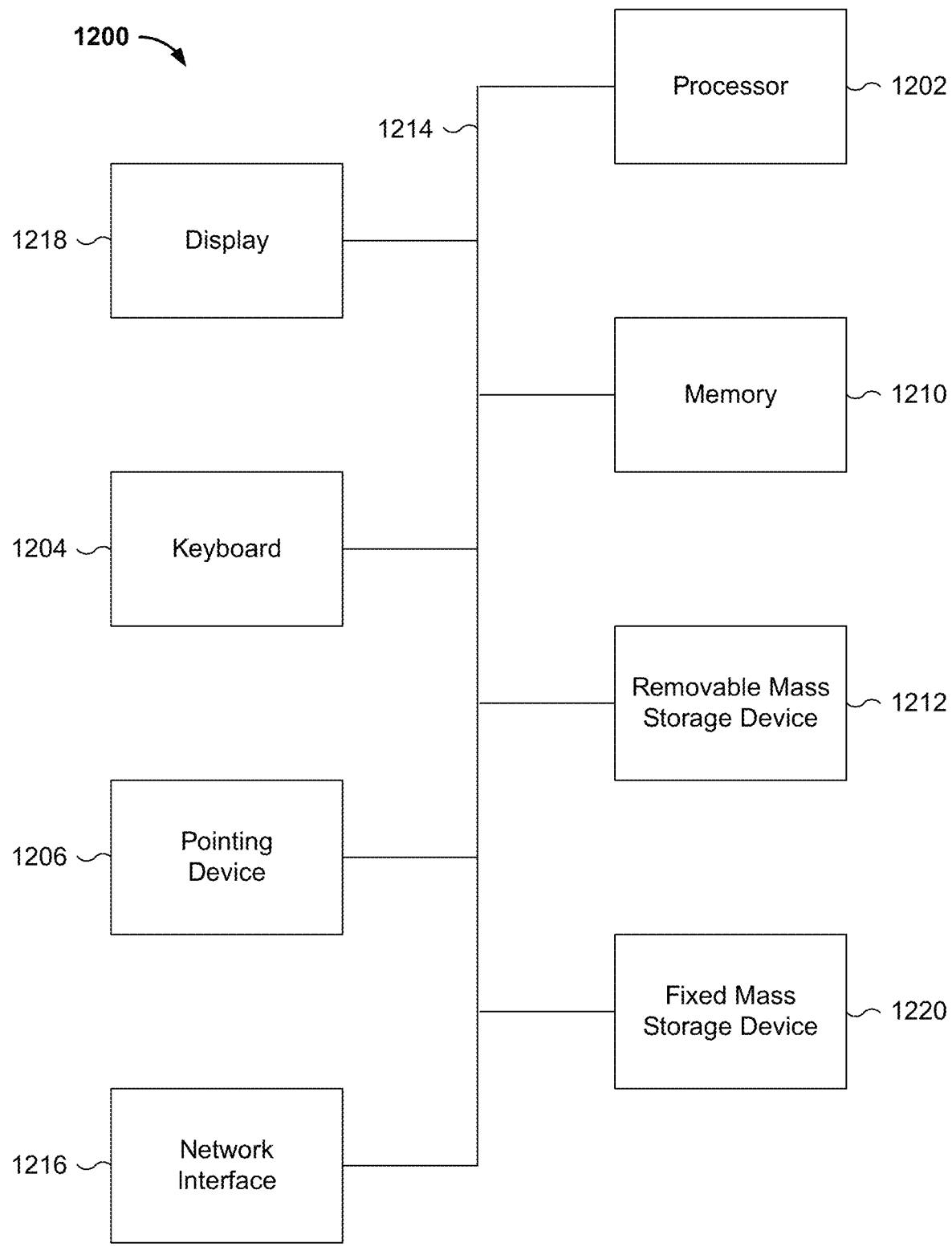
FIG. 12 is a functional diagram illustrating a programmed computer system for graph search and visualization in accordance with some embodiments.

A process for training a graph search and visualization system is shown in FIGS. 1-4. A process for serving queries using the trained graph search and visualization system is shown in FIG. 5. A system for performing the processes is shown in FIGS. 6 and 12. Some example graphical user interfaces are shown in FIGS. 7-11.

FIG. 1 is a flow chart illustrating an embodiment of a process for graph search and visualization. Using the example of detecting fraud in transaction data, the process generates graphs from tabular transaction data in a way tailored for capturing fraudulent behavior, and determines similarities between the generated graphs. The process can be performed by a system such as system 610 shown in FIG. 6 or system 1200 shown in FIG. 12.

The process begins by receiving data, where the data includes transaction data entries (100). The transaction data entries can be received in the form of table, text, or any other non-graphical form. For example, each row in a table represents a separate transaction, and each column corresponds to a feature of the transaction. A first row in the table represents a first transaction with columns for the timestamp, IP address, the card number, etc. The next row represents another transaction, etc.

The process generates one or more graphs using the received data (102). The process extracts information from the received data to create a graph made up of nodes and edges. Referring to the tabular transaction data example in which each row in a table corresponds to a separate transaction and each column corresponds to a feature of the transaction, the process parses the table to extract relevant information to create nodes and edges in a graph.

For example, nodes in a graph represent the entities involved in a transaction, and edges in the graph represent their transaction relations. Examples of the entities can be accounts, clients, cards, IP addresses, devices, and so on, which are identified and extracted from the tabular transaction data. They represent the generic types of entities which can be involved in a transaction. A node can have attributes specific to each entity, such as the ID of the entity or its type. Whenever two entities co-exist together in the same transaction, this relationship will be encoded in their shared edge. An edge can have attributes shared by the entities such as the timestamp or the amount of the transaction.

The process calculates one or more vectors for the one or more graphs, where the one or more vectors each identifies a corresponding portion of the one or more graphs (104). Calculating vectors for the graphs is also called graph embedding. The process converts each graph into one or more vectors, which embeds its information. Graph embedding permits the graph to be more efficiently explored. In one aspect, a graph can be represented by a list of vectors, which is smaller than the original list of transactions, meaning storing the list of vectors takes less memory than storing the original list of transactions. Thus, processing the vectors is faster than processing the original transaction data or a graphical form of the transaction data. In another aspect, vectors can be easily searched and compared because comparing vectors typically uses fewer computational resources than comparing graphs. In various embodiments, the process computes the Euclidean distance between the calculated vectors in vector space, and stores this information to represent a corresponding graph or portion of a graph.

The process can implement any embedding method such as direct embedding and node embedding. When embedding a graph directly, a function converts each graph into a numeric vector. When using node embedding, a function converts each of the graph's nodes into a numeric vector and then aggregates the node embeddings for each graph using differential pooling. Other embedding methods include unsupervised embedding method that uses the topology of the graph (FIG. 2), and supervised embedding method that takes into account node features, such as timestamp and amount (FIG. 3).

The disclosed graph embedding techniques are more efficient than conventional methods because conventional methods typically use exact graph distance measures such as the Graph Edit Distance (GED), which is computationally expensive and do not scale well for large graphs such as those having on the order of millions of nodes and edges.

The process groups the calculated vector(s) into at least one group of vectors (106). Identifying groups of vectors is also called "clustering" because the process extracts groups (clusters) of vectors that match patterns. The process defines a cluster of vectors by determining that vectors match a data pattern of interest. The number of groups identified can be based on a model report as further described below.

A data pattern of interest may be predefined or known patterns stored for comparison. New data patterns can also be learned over time. In the example of fraud detection, the data patterns of interest are known patterns such as mule accounts, triangle schemes, structuring, carding (or card testing), high speed ordering, account takeover, identity theft, stolen cards or bot attacks, etc. The identified matching vectors correspond to fraud behavior matching one or more of these patterns. The degree of match can be determined on some scale such as 1-100% as further described with respect to FIG. 11.

In various embodiments, the process runs a clustering model to identify the matching vectors. Various models may be used/fine-tuned to improve identification. One example model is a Hierarchical Agglomerative Clustering model. A user may interact with 106 of FIG. 1 to build or tune a clustering model via the process of FIG. 4.

The process identifies a representative graph for each of the at least one group of vectors (108). In various embodiments, the representative graph for a cluster is the graph with the lowest average distance to every other graph in the cluster, and so it is sometimes referred to as the "center" of the cluster. As further described below, the representative graph may be used to respond to graph queries by comparing the query graph to clusters usings the representative graph for each cluster.

The process stores the identified group(s) of vectors and a respective identified representative graph (110). In various embodiments, the process stores a group (cluster) of matching vectors along with a representative graph. Multiple groups with representative graphs may be stored. The clusters (or representative graph for each cluster) forms a knowledge base. Later, a fraud analyst examining a graph to determine whether there is fraud can compare the graph to the groups in the knowledge base using the disclosed techniques to make that determination as described with respect to FIG. 5.

As the process receives new transactions and analysts discover new fraud patterns, the knowledge base may become increasingly outdated. The process can be run/repeated on demand or periodically to update the knowledge base as follows. The process receives a dataset of new transactions (transactions that have not been previously processed) (100), generates graphs based on the new dataset (102), calculates graph embeddings of the generated graphs (104) and adds the new embeddings to the embeddings present in the previous knowledge base. The process then extracts the initial groups of graphs with similar patterns (the clusters), e.g., by running a Hierarchical Agglomerative Clustering model on the set of the new and old embeddings (106). The process then computes the representative graphs (108) of each cluster (the graph with the lowest average distance to every other graph in the cluster) and saves the final clusters and their representative graphs (110).

The following figures describe some examples of how to calculate vectors/perform graph embeddings (104).

Figure 2:
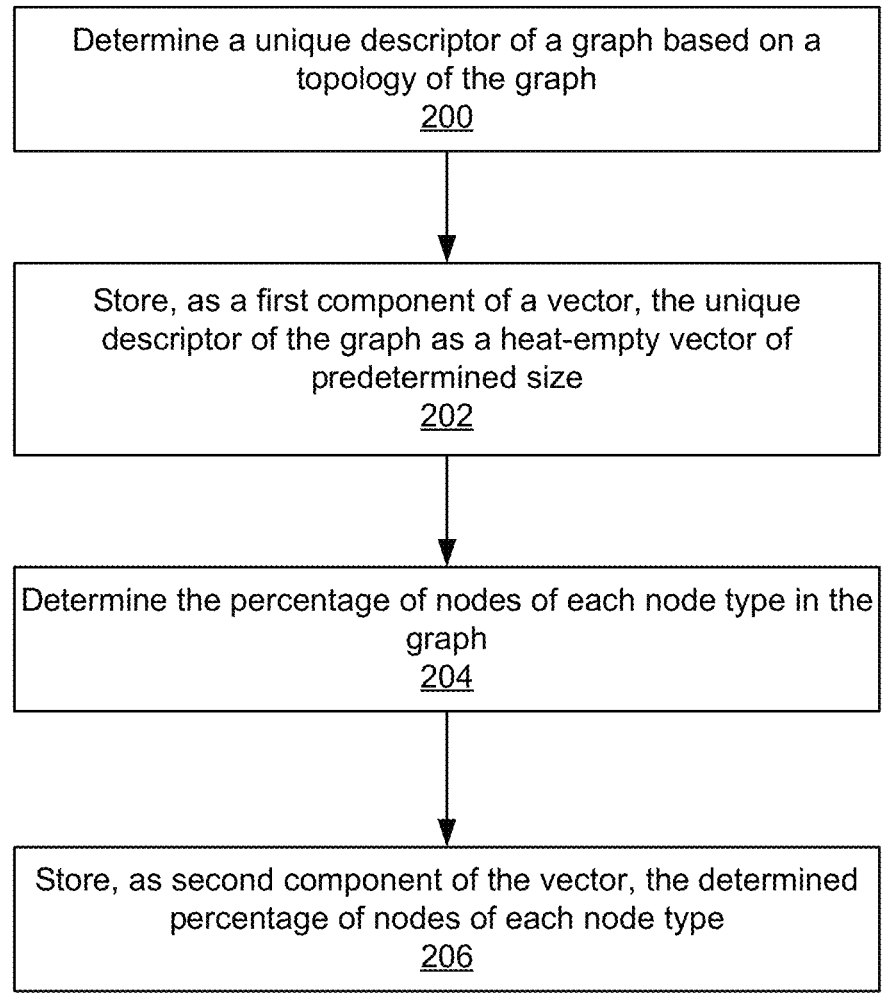
FIG. 2 is a flow chart illustrating an embodiment of a process for graph embedding using unsupervised learning.
Figure 3:
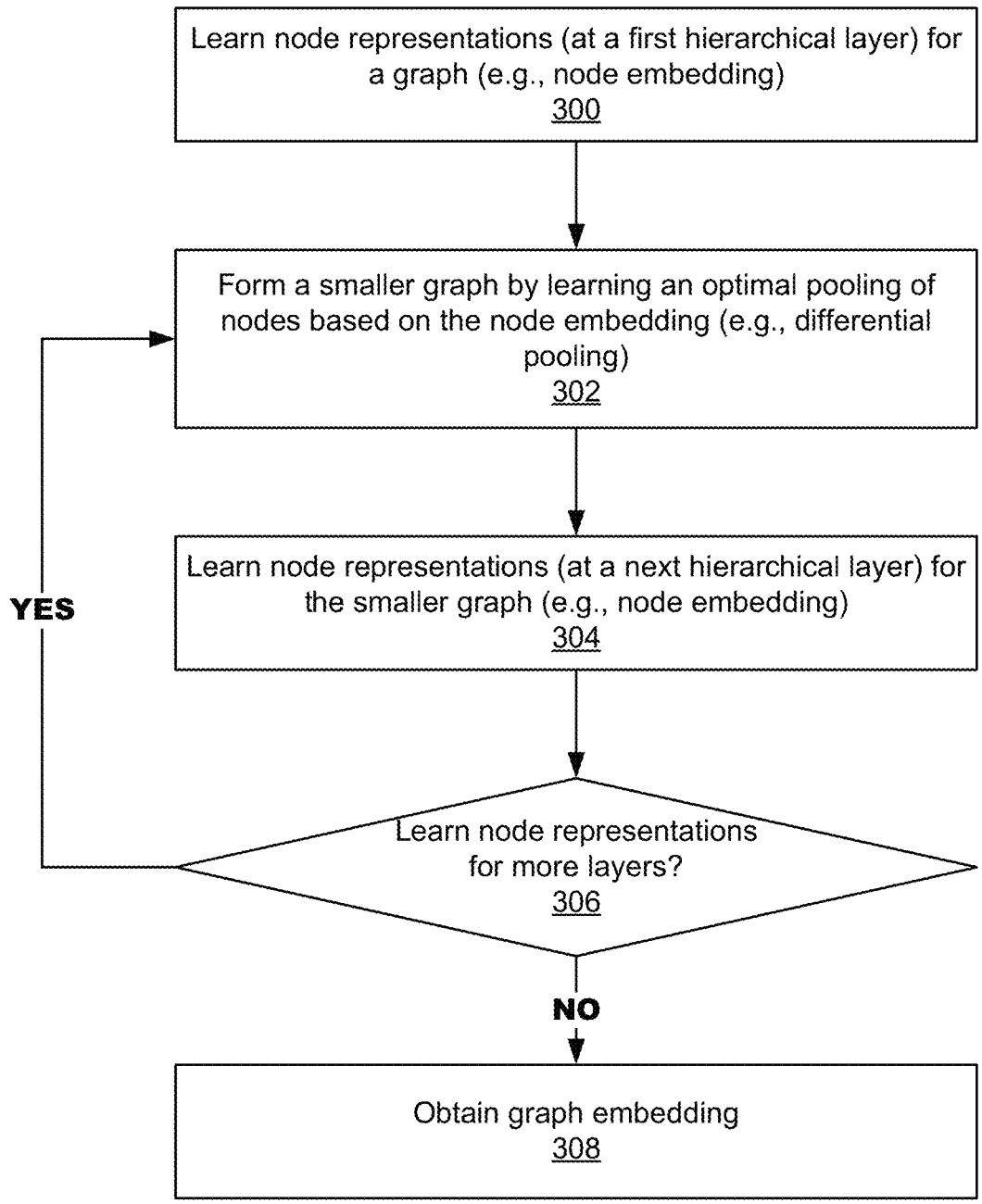
FIG. 3 is a flow chart illustrating an embodiment of a process for graph embedding using supervised learning.

FIG. 2 is a flow chart illustrating an embodiment of a process for graph embedding using unsupervised learning. This example of a graph embedding process is called "NetBoost" and uses unsupervised learning to calculate vectors for a graph. The process can be performed as part of another process such as 104 of FIG. 1.

NetBoost is a graph embedding method that uses the topology of the graph to compute its vector representation. NetBoost is highly efficient, easy to interpret, and does not need any learning mechanism to provide the embedding. This is efficient because it is permutation- and size-invariant, scale-adaptive, and linear in the number of nodes. In various embodiments, NetBoost encodes both the topology of a graph and its global node type distributions into a single vector. In other words, a NetBoost vector includes two main components: a unique descriptor representing the topology of the graph and a vector that contains, for each node type in the graph, a percentage of nodes that is of that type.

The process begins by determining a unique descriptor of a graph based on a topology of the graph (200). The process uses the Laplacian spectrum and its heat or wave trace signatures to build a unique descriptor that encodes the structure (topology) of the underlying graph. Given a Netboost vector representing each graph, the distance between two graphs can be computed by extracting the descriptors of those graphs (which are vectors) and calculating a simple L2 distance.

The process stores, as a first component of a (NetBoost) vector, the unique descriptor of the graph as a vector of predetermined size (202). For example, the process stores a heat-empty Network Laplacian Spectral Descriptor (NetLSD) vector of a predetermined size (e.g., 50).

The process determines the percentage of nodes of each node type in the graph (204). The node type is encoded by determining the percentage (or more generally, ratio) of nodes of each node type, with each entry corresponding to the percentage of a single node type. Suppose a graph has two node types: transaction nodes and card nodes. The graph has a total of 8 nodes, 7 of which are transaction nodes and one of which is a card node. The percentage of nodes that are transaction nodes is 7/8 and the percentage of nodes that are card nodes is 1/8.

The process stores, as a second component of the (NetBoost) vector, the determined percentage of nodes of each node type (206). For example, the process stores a group of entries, the number of entries being based on how many distinct node types there are, and each entry corresponds to the percentage of a specific node type. Referring to the example of 205, the process stores two entries: 7/8 transaction nodes and 1/8 card nodes.

Conventional graph embedding methods typically do not determine and encode the percentage of nodes of each node type. Suppose a first graph/pattern is for a card shared by multiple users, and a second graph/pattern is for an IP address shared by multiple users. The first pattern is more suspicious than a second pattern because the first pattern indicates a stolen card, while the second pattern can simply be a public IP address that is then used by multiple people. The conventional NetLSD method could give two different graphs the same embedding because node type is not taken into consideration. Referring to the two patterns above, NetLSD would give both graphs the same embedding because it does not differentiate between a card node and an IP address node.

The NetBoost vector of the first pattern (a card shared by multiple users) would be the concatenation of its heat-empty NetLSD vector of size 50 and the vector (7/8, 1/8, 0), where 7/8 is the ratio of transaction nodes, 1/8 is the ratio of card nodes and 0 is the ratio of IP nodes. The NetBoost vector of the second pattern (an IP address shared by multiple users) would be the concatenation of the same NetLSD vector and the respective node ratios vector (7/8, 0, 1/8), so the two patterns would be differentiated.

FIG. 3 is a flow chart illustrating an embodiment of a process for graph embedding using supervised learning. This example of a graph embedding process is called "Diffpool" and uses supervised and/or unsupervised learning to calculate vectors for a graph. The process can be performed as part of another process such as 104 of FIG. 1.

Diffpool is a graph embedding method that combines a node embedding algorithm with a differential pooling mechanism. For purposes of illustration, the node embedding algorithm is GraphSAGE. However, any node embedding method can be used with the differential pooling mechanism, which provides flexibility to the end user to use any node embedding suitable for their use case.

A node embedding algorithm such as GraphSAGE learns node representations at each hierarchical layer, and the differential pooling mechanism successively aggregates these embeddings into clusters until arriving at a single representation. One of the advantages of Diffpool is that it is able to incorporate node attributes such as timestamps, amounts, and node types and allow a tailoring of the final representations to a given label by using one or more losses.

The process begins by learning node representations at a first hierarchical layer for a graph (300). This is also called node embedding. For example, the process may learn node representations by using GraphSAGE, which is an inductive node embedding framework. For each node, the process starts by sampling neighboring nodes and then learns a function that aggregates the attributes of these neighboring nodes into a vector representation of that node.

The process forms a smaller graph by learning an optimal pooling of nodes based on the node embedding (302). After using GraphSAGE to obtain an embedding of each node in a given graph at 300, the process learns an optimal pooling of nodes that results in a soft mapping of nodes to a set of clusters that form a new smaller graph that can serve as input for learning node representations (e.g., input to GraphSAGE).

The process learns node representations at a next hierarchical layer for the smaller graph (304). In this hierarchical layer (which follows the first layer of 300), the process will run on top of this coarsened graph, treating clusters as nodes and learning representations for them. In various embodiments, learning node representations for the next hierarchical layer is optional. That is, a single pooling layer can map directly to a final embedding so that all nodes are clustered into a single node.

The process determines whether to learn node representations for more layers (306). This process can be repeated for as many hierarchical layers as the user wishes to be encoded. The purpose of encoding information per hierarchical level is that both local as well as global graph information is embedded. Whether to learn node representations for more layers can be based on a predefined number of layers as specified by a user or automatically selected based on available computational resources or desired speed. User interaction with a model such as Diffpool is further described with respect to FIG. 4.

If node representations are to be learned for more layers, the process returns to 302 to form a smaller graph by learning an optimal pooling of nodes based on the node embedding of the next hierarchical layer.

Otherwise, if no layers are left to be learned, the process obtains a graph embedding (308). The graph embedding is a set of one or more vectors that result from successively running the node embedding and differential pooling. A model is trained to obtain embeddings for the graphs. Once the model is trained, the embedding for a graph will be the respective weights vector of the last layer of the model.

The model can be repeatedly trained using historical graphs and losses until the model performs to satisfaction such as a desired level of accuracy specified by a system or user. Diffpool can use three different losses, one supervised and two unsupervised. When training the model, a user is free to combine all three losses or use any combination of the three. Determining which losses to use is dependent on the preference of each user and what information the user wants to be encoded in the embeddings. The supervised loss is a standard cross-entropy loss and enables Diffpool to be trained end-to-end as a graph classification task. In a fraud detection use case for example, this task is binary, separating the fraudulent graphs from the non-fraudulent ones.

If a user of the graph search and visualization system finds it important that the embedding space maximizes the fraud separation between the embeddings, then Diffpool would be trained using the supervised loss.

If a user wishes to encode solely structural information in the embeddings, without the influence of labelled data and the biases it may introduce in the embeddings space, then using the unsupervised losses is suitable. For example, a link prediction loss and an entropy loss may be used. The link prediction loss encodes the intuition that nearby nodes should be clustered together in the pooling stage. The entropy loss forces the output of the pooling cluster assignment to be closer to a one-hot encoded vector (i.e., each node is assigned with high certainty to one cluster). These two losses allow Diffpool to effectively encode hierarchical information of the graph structure at each pooling stage. Furthermore, coupling these unsupervised losses with the supervised one may improve model training stability.

The graph search and visualization system may be implemented in such a way that a user is free to choose which Diffpool configuration best suits their needs.

Figure 4:
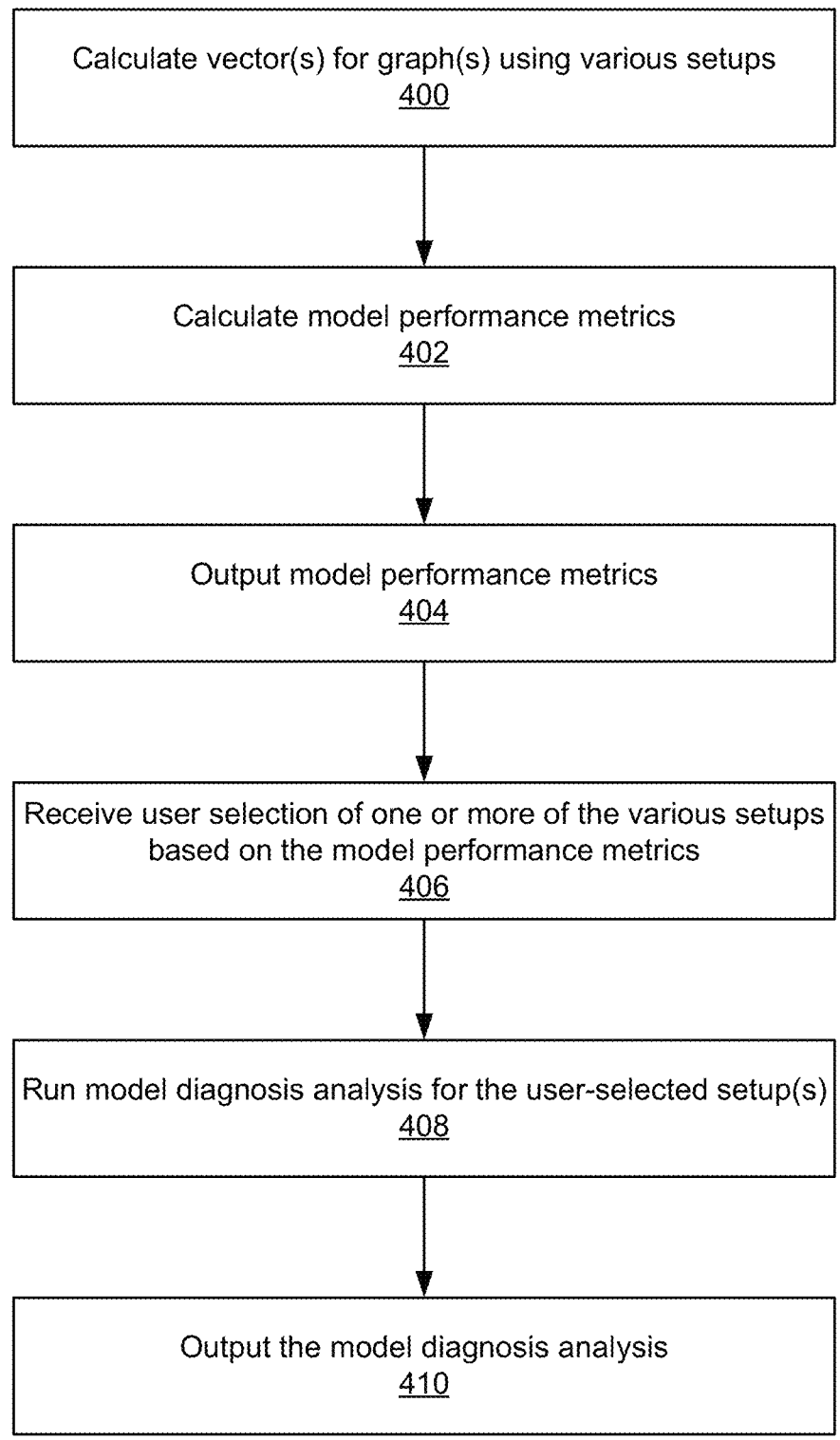
FIG. 4 is a flow chart illustrating an embodiment of a process for building a clustering model.

FIG. 4 is a flow chart illustrating an embodiment of a process for building a clustering model. The clustering model takes as input graph embeddings (vectors) and forms one or more groups so that the graph embeddings can be more easily and quickly searched, and consequently graphs can be more efficiently searched and compared. This process can be performed to build or tune a clustering model suited for a user's domain. The process can be performed by system 610 of FIG. 6 or by a processor shown in FIG. 12.

Since building a clustering model that works well for a particular use case may involve some fine-tuning, this process collects and determines information useful for a user tuning a knowledge base. The information can be present in the form of a model selection report and/or a model diagnosis report, some examples of which are shown in FIGS. 13A-14G.

The process begins by running a model with various setups (400). One example of a clustering model that can be used to determine groups of vectors (106 of FIG. 1) is Hierarchical Agglomerative Clustering. Table 1 shows example setups for Hierarchical Agglomerative Clustering. The process runs the model with these setups.

TABLE 1

| Parameter | Values |
| --- | --- |
| Linkage: | Single, complete, or average |
| Clusters: | 2 to 60 |

The process then computes and plots some model performance metrics (402). Some example plots include a dendrogram plot, a silhouette coefficient plot, and a fraud separation error plot. These plots can be outputted in a model selection report for a user (e.g., a data scientist to review).

Figure 13A:
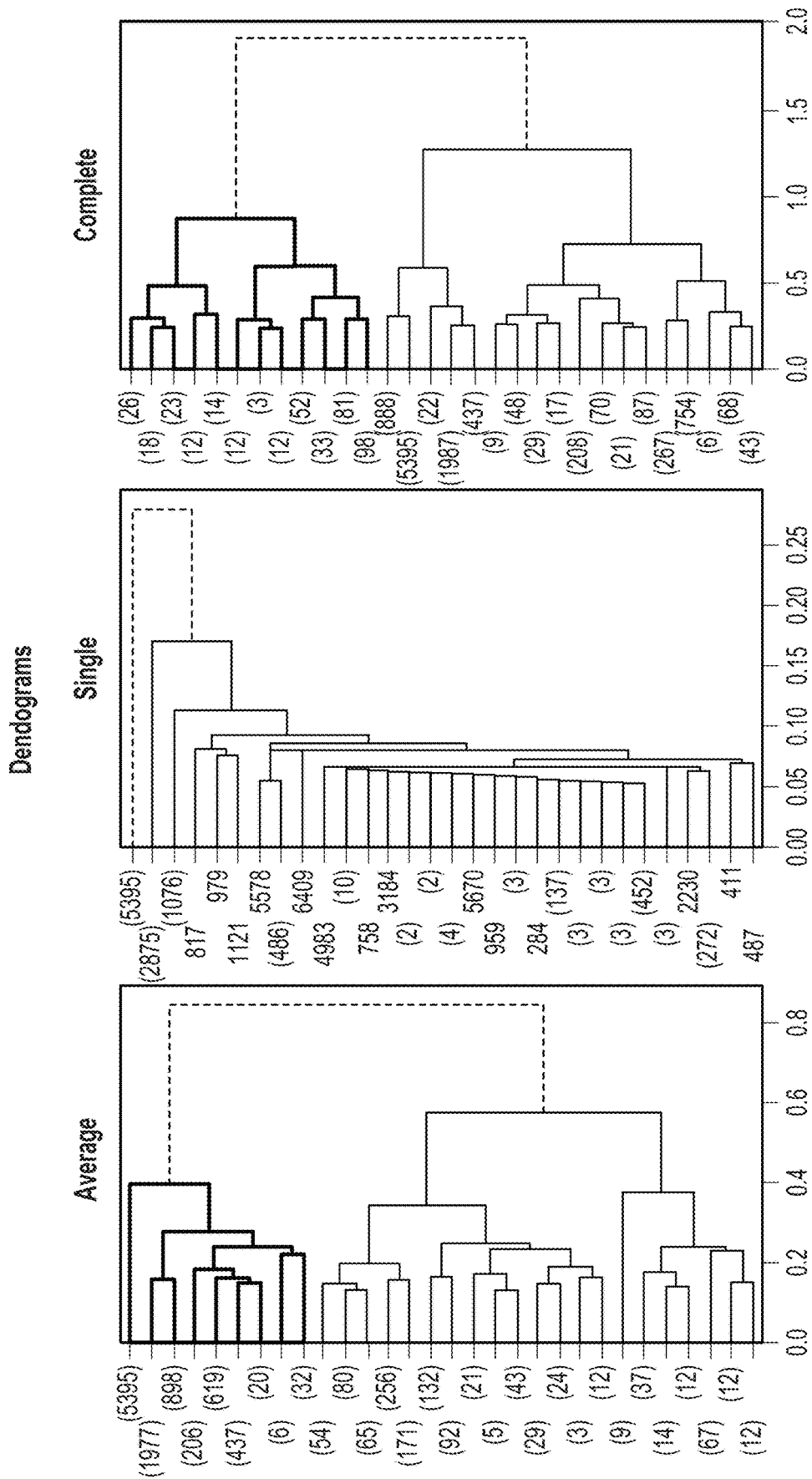
FIG. 13A shows an example of metrics that can be output in a report.
Figure 13B:
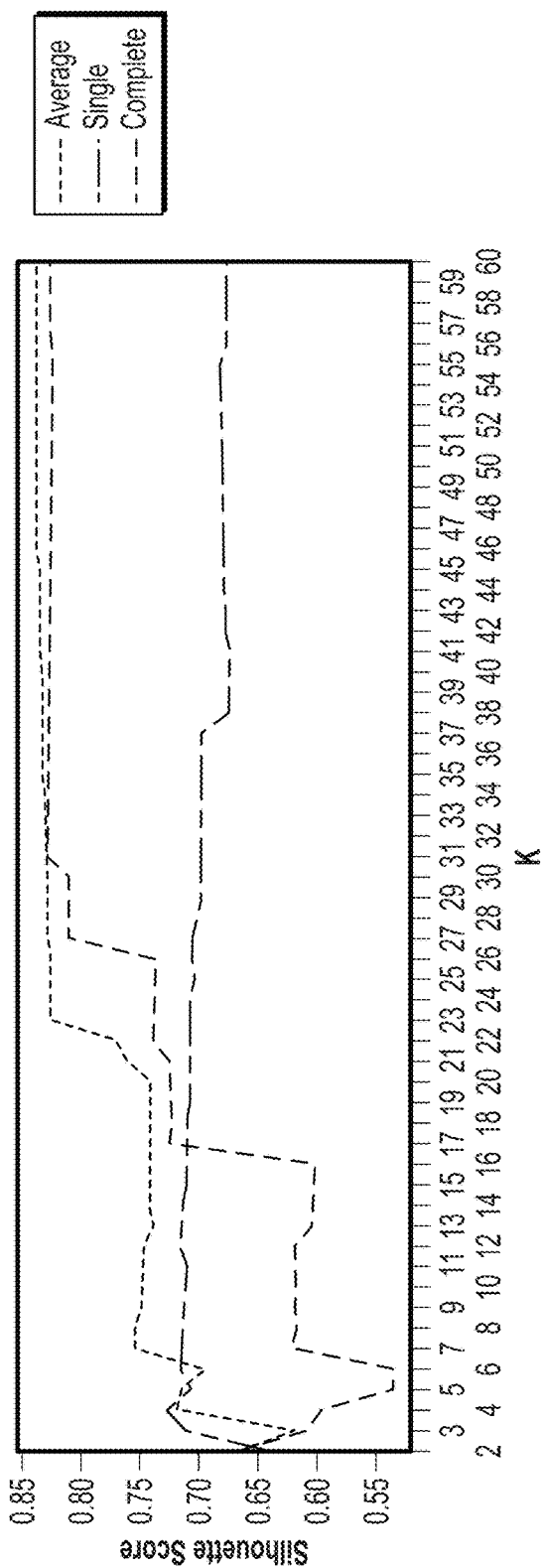
FIG. 13B shows an example of metrics that can be output in a report.
Figure 13C:
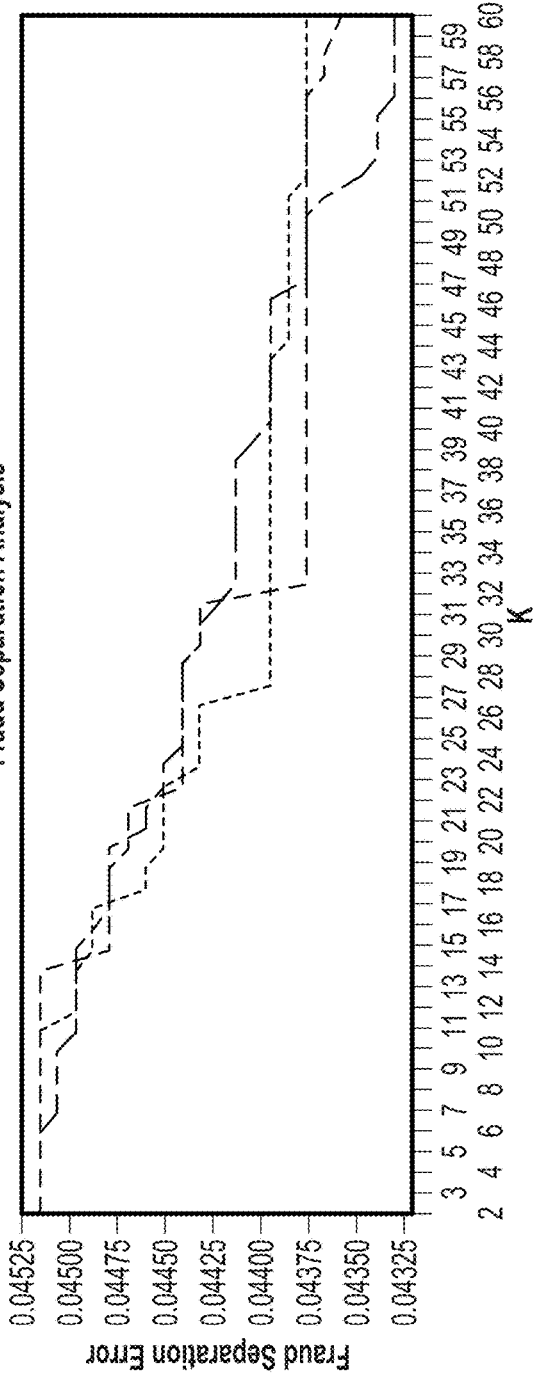
FIG. 13C shows an example of metrics that can be output in a report.
Figure 14A:
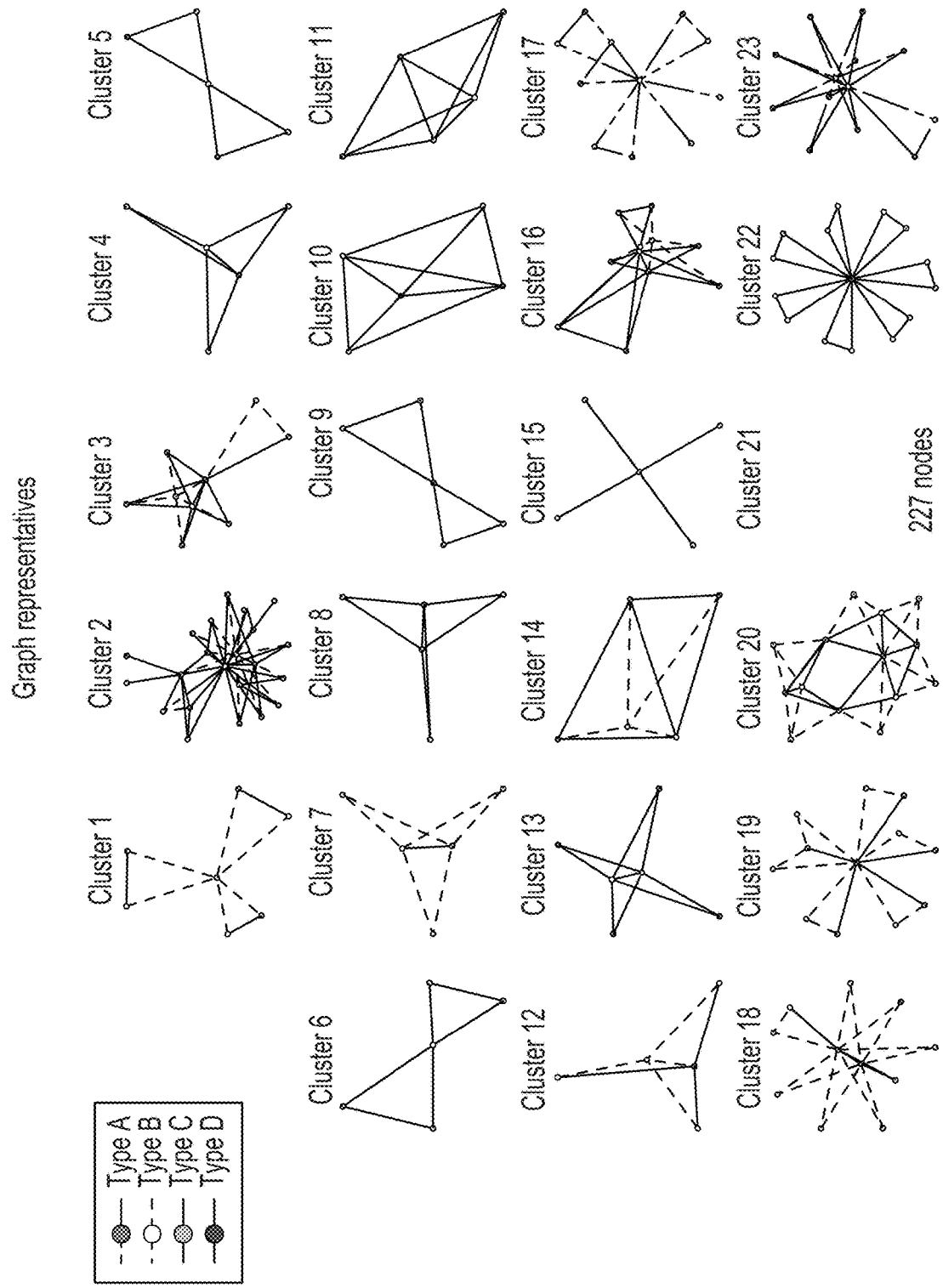
FIG. 14A shows an example of metrics that can be output in a report.
Figure 14B:
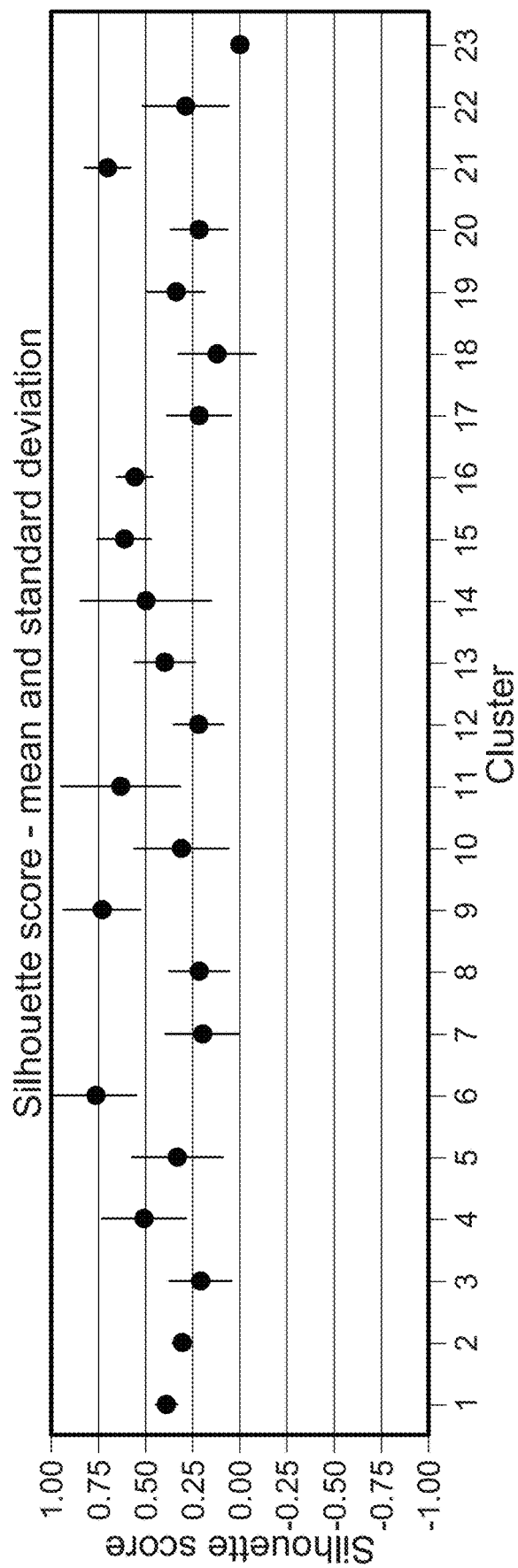
FIG. 14B shows an example of metrics that can be output in a report.
Figure 14C:
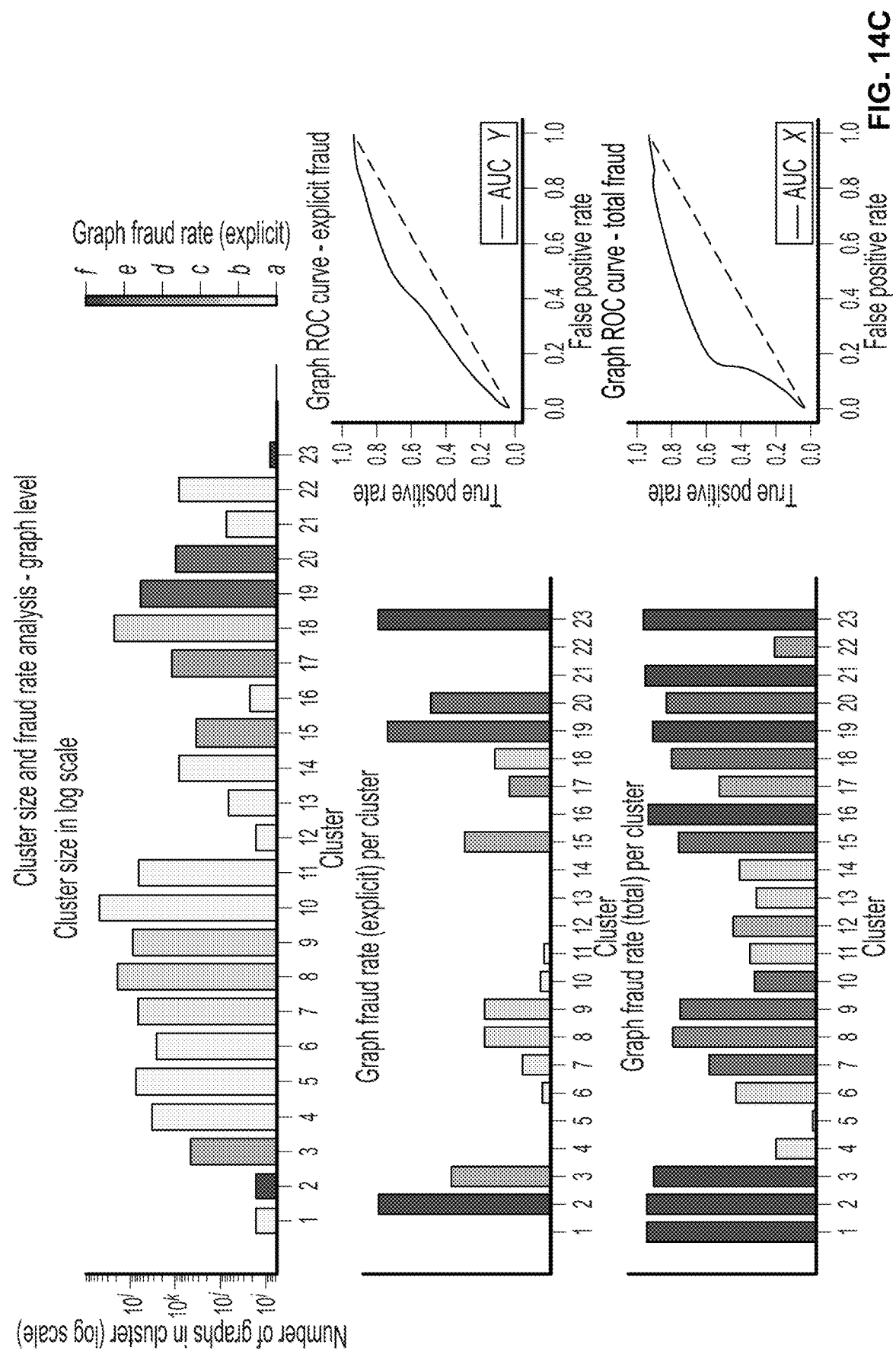
FIG. 14C shows an example of metrics that can be output in a report.
Figure 14D:
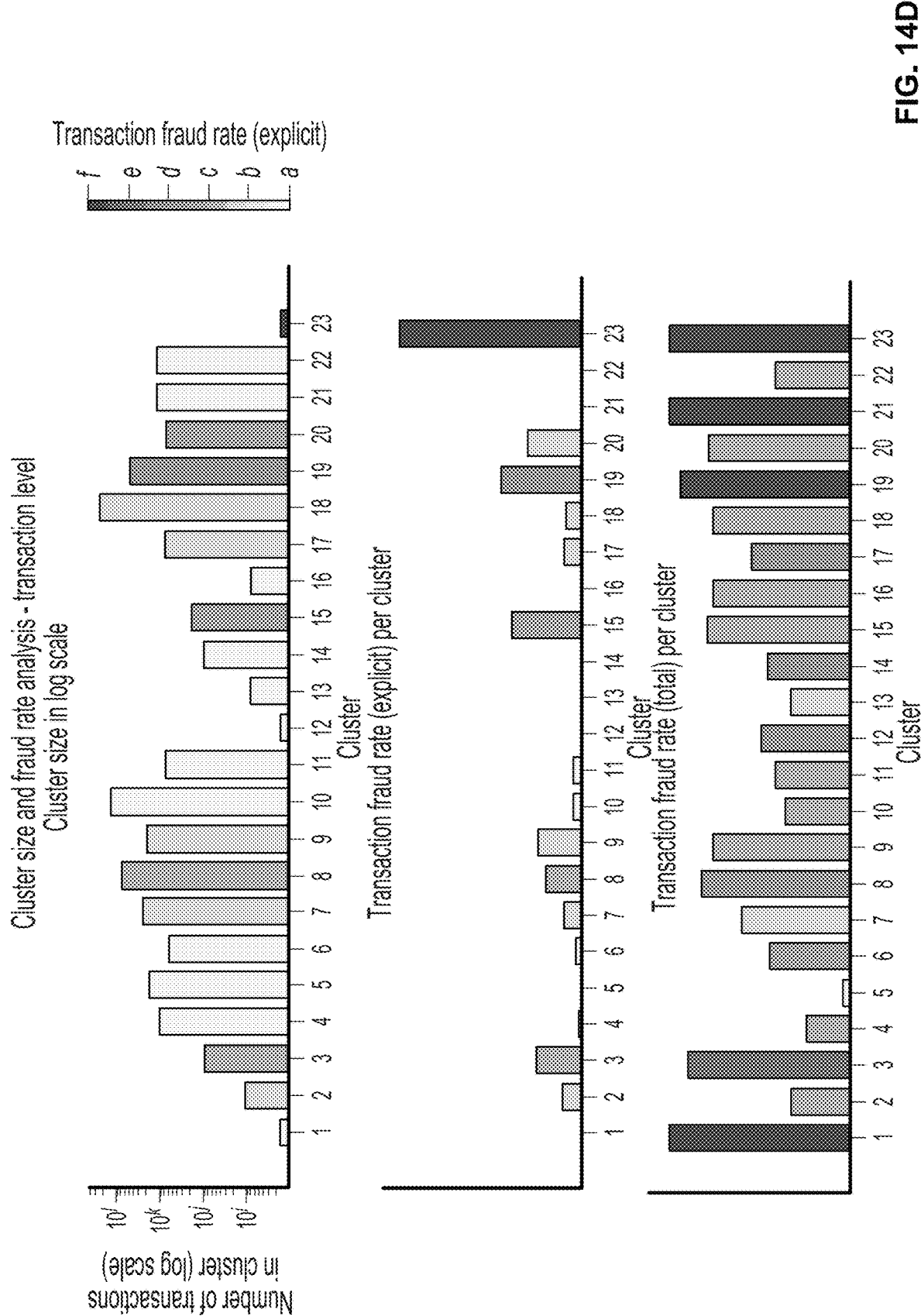
FIG. 14D shows an example of metrics that can be output in a report.
Figure 14E:
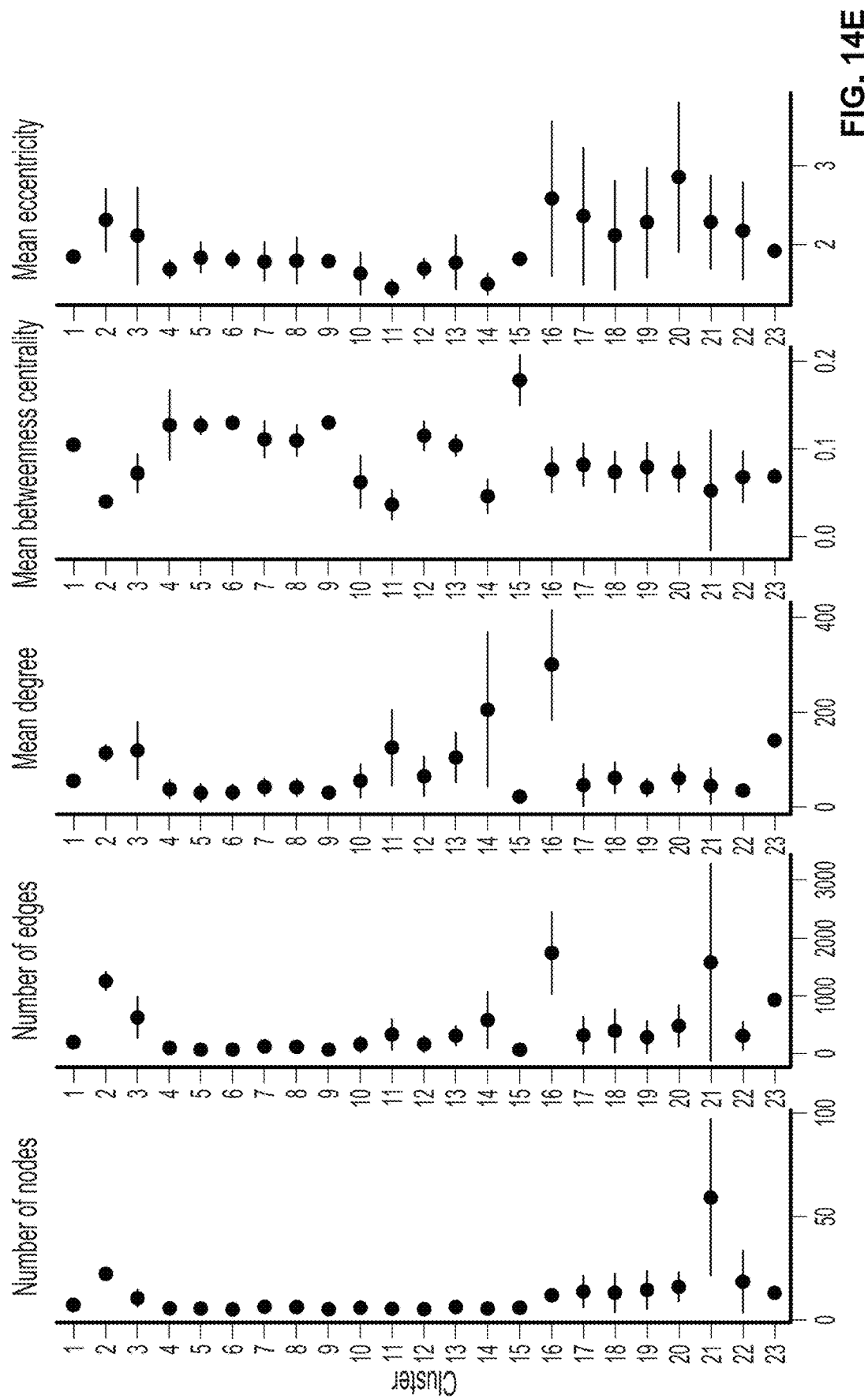
FIG. 14E shows an example of metrics that can be output in a report.
Figure 14F:
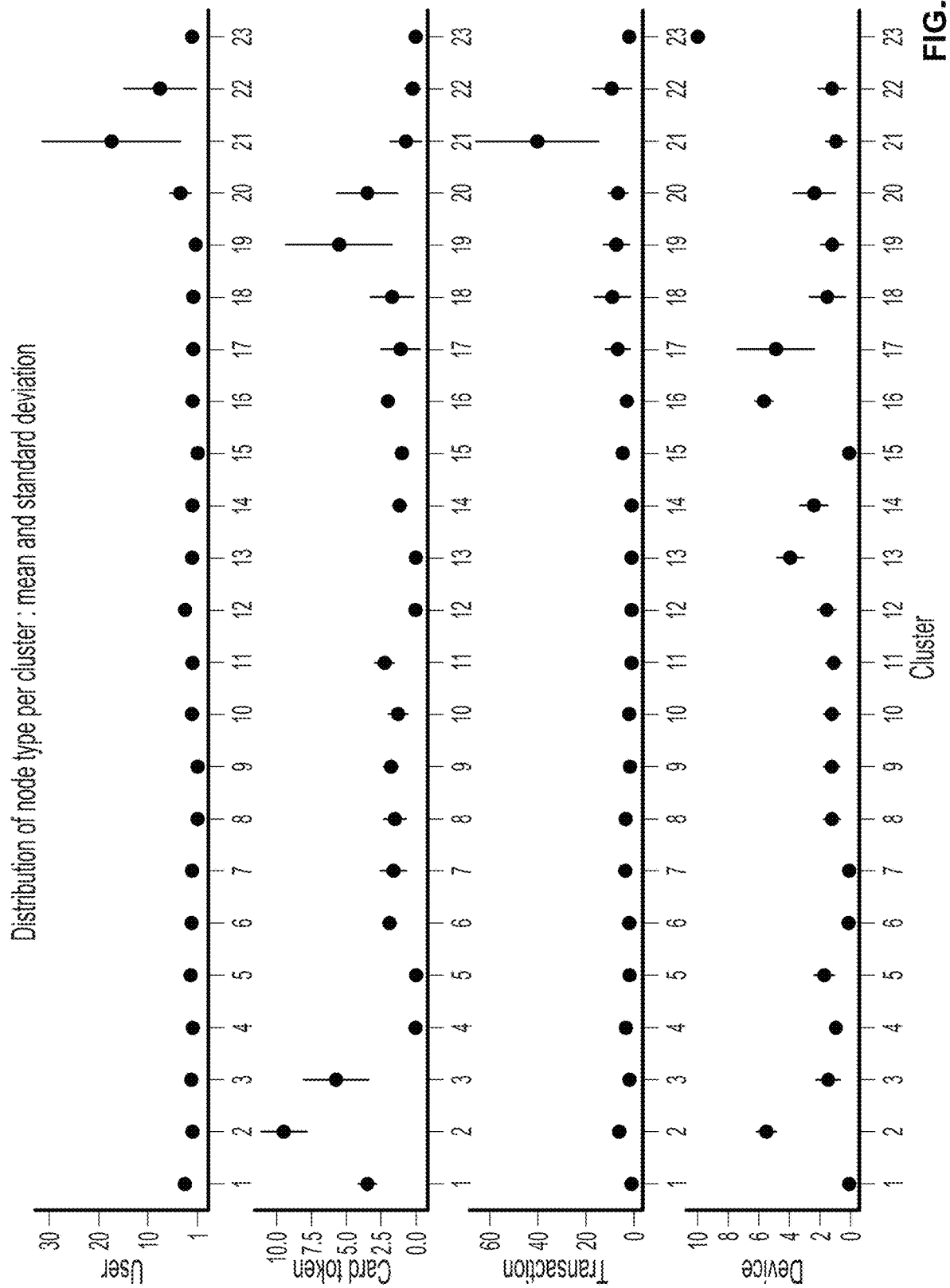
FIG. 14F shows an example of metrics that can be output in a report.
Figure 14G:
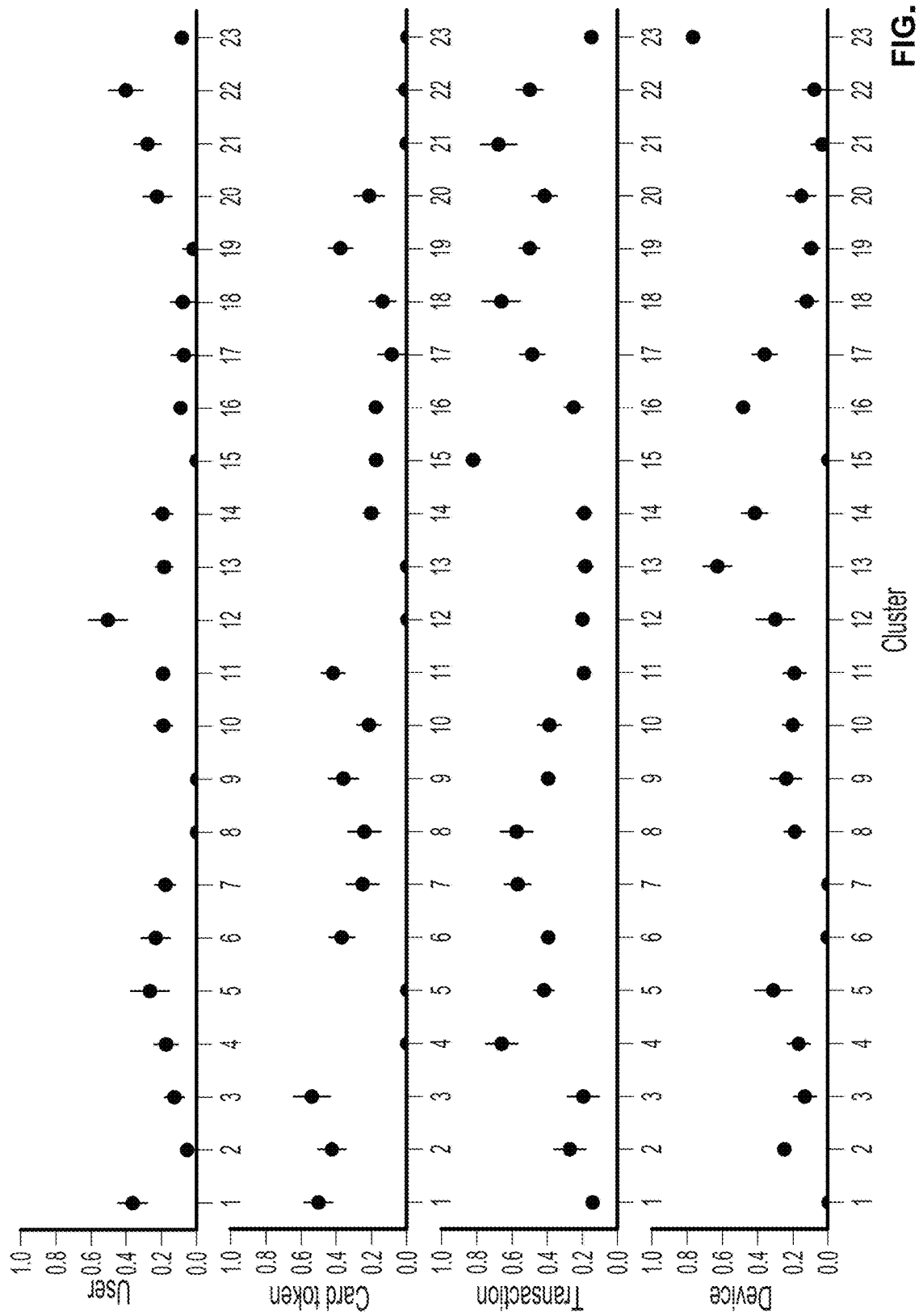
FIG. 14G shows an example of metrics that can be output in a report.

The process outputs the model performance metrics (404). As described, these metrics can be the form of one or more of the following plots. FIGS. 13A-13C show examples of metrics that can be output in a report.

A dendrogram plot (FIG. 13A) is a tree diagram that represents the clusters formation steps produced by a hierarchical clustering model. It is independent of the number of clusters as it visually summarizes the distribution of the data for each successive cluster formation.

A silhouette coefficient plot (FIG. 13B) shows the evolution of the silhouette coefficient with an increasing number of clusters for each linkage type. The silhouette coefficient is a classical clustering performance score that does not require knowledge of the true cluster labels. It is calculated using the mean intra-cluster distance, $D_{in}$, and the mean nearest-cluster distance, $D_{out}$, for each instance (in this case, a graph embedding). The silhouette coefficient for an instance is then $(D_{out}-D_{in})/\max(D_{in}, D_{out})$, while the silhouette coefficient for a specific cluster or for the whole clustering solution is an average silhouette coefficient of all the concerned instances. This score varies between −1 and 1, with −1 indicating that a good portion of instances were assigned to the wrong clusters, 0 indicating that there are many overlapping clusters and 1 indicating that a good portion of instances were assigned to the correct clusters and the clusters do not overlap.

A fraud separation error plot (FIG. 13C) contains the same information as the silhouette coefficient plot, but instead of plotting the silhouette coefficient, it plots the fraud separation error. As the name implies, this metric expresses how well the clusters can separate fraudulent graphs from non-fraudulent graphs. The fraud separation error plot uses underlying labels of a historic dataset. It is defined by the following equation, where N is the total number of graphs, $N_i$ is the number of graph in cluster i, $FR_i$ is the true fraud rate in cluster i and $FL_i$ is the predicted fraud label of cluster i (i.e., the majority label in the cluster):

$$\frac{1}{N}\sum_{i=1}^{n} N_i |FR_i - FL_i| \qquad (1)$$

The process receives user selection of the various setups based on the model performance metrics (406). After analyzing the model selection report, a user (e.g., a data scientist) can then pick some specific setups where the performance is reasonable.

The process runs a model diagnosis analysis for each specific setup (408). Running a model diagnosis analysis generates performance information about the setups selected by the user at 406. The analysis can be conveyed by one or more plots to help a user visualize how well a model with a specific setup performed.

The process outputs the model diagnosis analysis for each specific setup (410). For example, the output can be in the form of a model diagnosis report with one or more of the following components. FIGS. 14A-14G show examples of metrics that can be output in a report.

Graph representatives plot (FIG. 14A), which is a plot with the center graph of each cluster Silhouette by cluster plot (FIG. 14B), which is a plot with each cluster's average Silhouette coefficient and its standard deviation Cluster size and fraud rate analysis (FIGS. 14C and 14D), which may be represented by three plots. The first shows the number of graphs in each cluster, the second shows the graph fraud rate in each cluster, and the third shows a ROC curve for the clustering method. The cluster size and fraud rate analysis can be displayed at the graph level or the transaction level.

Graph features distribution plot (FIG. 14E), which is a plot with the mean and the standard deviation of a set of graph features for each cluster. The features are number of nodes, number of edges, mean degree, mean betweenness centrality and mean eccentricity.

Node type distribution plot (FIGS. 14F and 14G), which is a plot with the mean and the standard deviation of each node type's ratio for each cluster.

UMAP plot (1050 of FIG. 10A), which is a scatter plot with the two-dimensional UMAP representation of each embedding, colored by the assigned cluster. The UMAP (Uniform Manifold Approximation and Projection) is a dimensionality reduction technique that preserves the local structure of the data in their original dimensions.

FIG. 5 is a flow chart illustrating an embodiment of a process for finding graphs similar to a query graph. The process receives a query graph and determines one or more graphs similar to the query graph. The process can be performed on-demand. The process can be performed by system 610 shown in FIG. 6 or by system 1200 shown in FIG. 12.

The process receives a query graph (500). The query graph is one for which similar graphs will be found by the process. An example of a query graph is the current graph shown in FIG. 7. The process can determine recommendations associated with the query graph and convey such recommendations via the user interface shown in FIG. 7.

The process calculates one or more vectors for the query graph (502). In other words, the process calculates embeddings of the query graph and may use the same process as 104 of FIG. 1 to calculate the embeddings.

The process identifies one or more graphs similar to the query graph including by comparing the calculated one or more vectors for the query graph with one or more previously-calculated vectors for a different set of graphs (504). The process refers to a knowledge base such as the one generated by the process of FIG. 1 to find graphs similar to the query graph. The knowledge base contains previously-calculated vectors for a different set of graphs (e.g., graph embeddings of other graphs).

In various embodiments, the process identifies similar graphs by first comparing the query graph's embedding to the clusters' centers to identify a closest (candidate) cluster, and then comparing the query graph's embedding to members of the closest cluster. The clusters are retrieved from a knowledge base and may be identified by a process such as the one in FIG. 1.

The process outputs the identified similar graphs (506). The number of similar graphs to be returned in response to the query graph can be predetermined. For example, the process returns the n closest graphs as the query result. The process can also output any extra information related to those graphs (e.g., fraud label, total amount, etc.). The output can be rendered on a graphical user interface as further described below.

FIG. 6 is a block diagram illustrating an embodiment of a system for graph search and visualization. An example of a graph search and visualization system is Genometries by Feedzai. System 610 includes graph representation engine 612, search engine 620, and user interface engine 630.

Graph representation engine 612 is configured to process transaction data (e.g., non-graphical data), generate graphs from the transaction data, and embed the graphs (calculate vectors for the graphs) so that they can be explored and compared more easily. In various embodiments, the graph representation engine is configured to perform 100-104 of FIG. 1.

The graph representation engine transforms transaction data to graphical form by defining a way of extracting graphs from transaction data. The extraction can be tailored for a specific domain such as for capturing fraudulent behavior as described herein. After obtaining graphs, the graph representation engine obtains graph embeddings by calculating vectors for the graphs. The graph representation engine performs/supports various graph embedding techniques including the supervised and unsupervised techniques disclosed herein. The graph representation engine or an administrator can select a type of graph embedding method appropriate for a particular domain. For example, NetBoost and Diffpool are particularly suitable for transaction graphs for fraud detection. The graph representation engine is flexible enough to allow the user to introduce new graph embeddings, e.g., one can use directly a graph-level embedding of choice or provide a node-level embedding which is then aggregated into a graph-level embedding with differential pooling. The graph embeddings can be used to efficiently serve graph similarity searches.

Search engine 620 is configured to determine similarity between graphs and store historical patterns (clusters) to provide a faster response to graph queries compared with conventional techniques. The search engine computes the distance between the vectors (embeddings) calculated by the graph representation engine to determine similarity between graphs. In various embodiments, the search engine is configured to perform 108-110 of FIG. 1.

In various embodiments, the search engine searches, for a specific graph, a pool of historical graphs and returns a predefined number of the closest graphs to the specific graph. The transaction datasets may be quite large, so directly comparing the embedding of the query graph against the embeddings of all the historic graphs is slow. Instead of using all of the historic graphs, in various embodiments, the search engine applies a clustering algorithm to all the historic graph embeddings in order to form groups of graphs based on similarity. The search engine then selects a representative graph for each cluster (the center of the cluster), and, for each query, performs a top level search on the centers of the clusters before performing a second level search within the cluster with the closest center to the query.

A grouping of historical graph embeddings and the corresponding centers is called a knowledge base and may be stored in store 680. The search engine is configured to build and search the knowledge base. In various embodiments, the search engine includes Cluster Initialization Module 622 to initialize the knowledge store, Cluster Update Module 624 to update the knowledge store, and Querying Engine 626 to serve graph search and visualization queries. The modules are depicted as three functional blocks, but may be implemented by one or more processors.

Cluster Initialization Module 622 is configured to initialize the knowledge base. In various embodiments, this module runs once, during the first deployment in a client, using historical transaction data. The Cluster Initialization Module receives historical transaction data and creates the first knowledge base. Given a historical transaction dataset, this module is configured to perform the process of FIG. 1, that is, generate the graphs based on the tabular transaction dataset, compute the embeddings of the generated graphs, and extract the initial groups of graphs with similar patterns (the clusters), e.g., by running a Hierarchical Agglomerative Clustering model. This module optionally runs model performance and diagnosis reports and iterates until reaching the desired performance (the process of FIG. 4 for example). This module computes and saves the representative graphs of each cluster, which is the graph with the lowest average distance to every other graph in the cluster, and saves the final clusters and their representatives.

Cluster Update Module 624 is configured to update the knowledge store periodically or on demand. As new patterns appear in the transaction data, the knowledge store is updated to maintain good performance. Thus, this module can be run periodically with recent transaction data to maintain accuracy and efficiency.

Querying Engine 626 is configured to serve graph search and visualization queries on demand. It receives a graph and outputs the desired number of closest historical graphs. The Querying Engine is configured to process the on-demand similarity queries by receiving a query graph and returning a predetermined number of similar graphs (top-k similar graphs). In various embodiments, the querying engine in cooperation with the other components of system 610 is configured to perform the process of FIG. 5.

User interface engine 630 is configured to render a user interface with which client 650 interacts to access system 610 (a graph search and visualization tool). Client 650 may be operated by a user such as an analyst or data scientist. The user interface engine outputs a graph visualization and, optionally, additional information about the pattern (graph) being queried. For example, a user (such as an investigator or fraud analyst) of the graph search and visualization tool can explore and search a graph and otherwise interact with the graph search and visualization tool using the user interface.

In operation, when a user such as an analyst wishes to explore a graph of transaction data to detect fraud, the user accesses the system via client 650. The user provides a query graph via the user interface engine 630 seeking other similar graphs in the knowledge base 680 to determine whether the transactions corresponding to the query graph is likely fraud. The user interface engine forwards the query graph to the querying engine 626. The querying engine 626 uses graph representation engine 612 to obtain graph embeddings for the query graph. Then, the graph embeddings of the query graph can be compared with graphs in a knowledge base to find similar graphs, which get returned to the client 650 via the user interface engine 630.

The knowledge base is built by cluster initialization module 622 by performing the process of FIG. 1 on historical transaction data. The cluster initialization module uses the graph representation engine 612 to transform the transaction data to graphs and obtain graph embeddings for the graphs. The cluster initialization module then determines clusters of vectors and stores the clusters and a representational graph in store 680.

The clusters can be updated by cluster update module 624 to ensure that the knowledge base remains up-to-date as new transactions come in and new fraud patterns emerge. The cluster initialization module uses the graph representation engine 612 to transform the new transaction data into graphs and obtain graph embeddings for the graphs. The process takes into account the new embeddings in addition to the embeddings present in the previous knowledge base. The cluster update module then determines clusters of vectors and stores/updates the clusters and a representational graph in store 680.

In various embodiments, the graph search and visualization tool makes use of a node-link diagram to display connections in the data. It follows a "search, show context, expand on demand" interaction paradigm. That is, an analyst will query the system and a graph matching the criteria will be presented. Then, the analyst can interact with the nodes to get additional information on the respective entities, such as attributes and connections.

Reading node-link diagrams can be time-consuming, and the disclosed graph search and visualization techniques help to minimize case review time. Network visualization builds a mental model for the analyst to think about the data and to visually recognize different fraud patterns, making it faster than traditional methods. However, this learning process can take weeks or even months. The disclosed techniques can accelerate this process, empowering even less experienced analysts to make faster and more accurate decisions.

In various embodiments, the entry point for the graph search and visualization user interface is the graph for the case under review. This graph is called the query graph, and the graph search and visualization system (specifically, the querying engine) gets the top-k similar graphs and their respective information. Given these networks, the fraud analyst can perform various tasks within the UI including comparing a graph under investigation with a graph from the set of similar graphs to understand how they are similar and navigating through the graphs in the set of similar graphs.

One way the user interface enables a user to make comparisons and navigate is using a card system in which cards are displayed to a user and the user can interact with the card. A card system maps a visual rectangular pane (a card) to each network. These cards can then be positioned side by side allowing a visual comparison of the information they display. As further described below, a user can navigate the networks by scrolling through a list view. Alternatively, a Map View is provided to support an overview of the set of similar graphs.

The following figures show examples of graphical user interfaces obtained in some embodiments.

Figure 7:
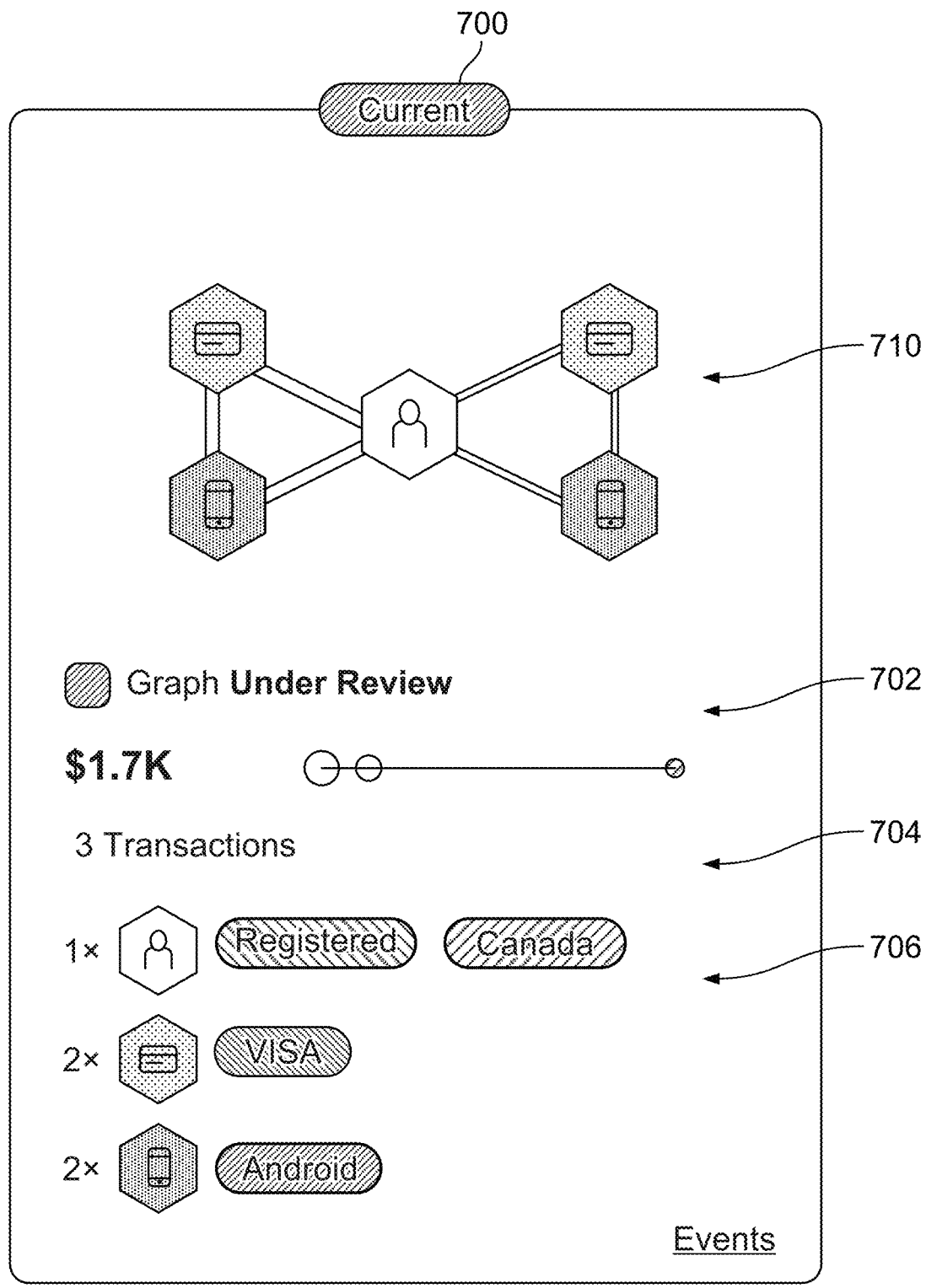
FIG. 7 shows an example of a graphical user interface for displaying a graph visualization card for a query graph.

FIG. 7 shows an example of a graphical user interface for displaying a graph visualization card for a query graph.

The front of the card (as shown) displays graph properties to be compared between networks. The displayed properties can be those that are most important for comparison purposes. In various embodiments, these properties are both topological, through a node-link diagram, with a force-directed layout, and attribute-based, such as graph label, total amount and transaction count, transaction timeline, entity type distribution and common entity attributes. For a deeper and more granular investigation, the list of transactions associated with the network can be accessed through a link on the bottom of the pane ("Events" in this example). Clicking the link will flip the card revealing the transactions in a tabular view. For example, the transactions may be displayed in a table like the one described with respect to 100.

In the example card shown in FIG. 7, a tag 700 indicates that this card includes information about a query graph. The query graph is also sometimes called the network in focus or under review because it is the one being studied by a user to determine whether the underlying transaction data involves fraud.

The card includes a node-link diagram 710, which is a graph representing underlying transaction data. The graph can be obtained by 102 of the process of FIG. 1. Below the diagram is a label 702 for the node-link diagram of the graph indicating whether the graph is under review (as shown), has fraud (see FIG. 9), or has only approved transactions (see FIG. 8). A visual aid such as a color encoding on the label value can be used and propagated to the border of the card to help a user quickly determine if the graph is under review, approved, has fraud, etc. This color can also match the color of the tag 700.

Below the label of the graph is a summary of the total amount and number of events along with a timeline (704). The minified timeline can be helpful for understanding time patterns and specific fraud behaviors. In the timeline, transactions are mapped as circles and positioned in a temporal horizontal line according to their timestamp. The size of the circles is proportional to the amount of the transaction and its fill color uses the same color encoding on the label value of each transaction. In the bottom section of the card includes an overview of common node attributes per node type (706). In this example, there is one account node, two card nodes, and two device nodes. As shown, node attributes associated with the account node include being a registered account and being from Canada. Node attributes associated with the card nodes include the payment network (Visa®). Node attributes associated with the device nodes include the operating system (Android®).

The information presented and ordering of the sections is merely exemplary and not intended to be limiting. For example, the cards of the search results have additional signals to support the visual comparison with the network under investigation. These signals can be visual elements that display the change in attribute-based properties such as an upward arrow signaling an increase in total amount.

For topological comparison, a structure analysis layout option is available for the node-link diagram. In this layout, the nodes of the network that match nodes in the focus graph are placed first and in the same position as in the node-link diagram for the focus graph, and other nodes are placed afterwards according to the force-directed layout. In various embodiments, the structure analysis layout involves a preprocessing step of network alignment between the network and the focus graph to obtain the matching nodes.

Figure 8:
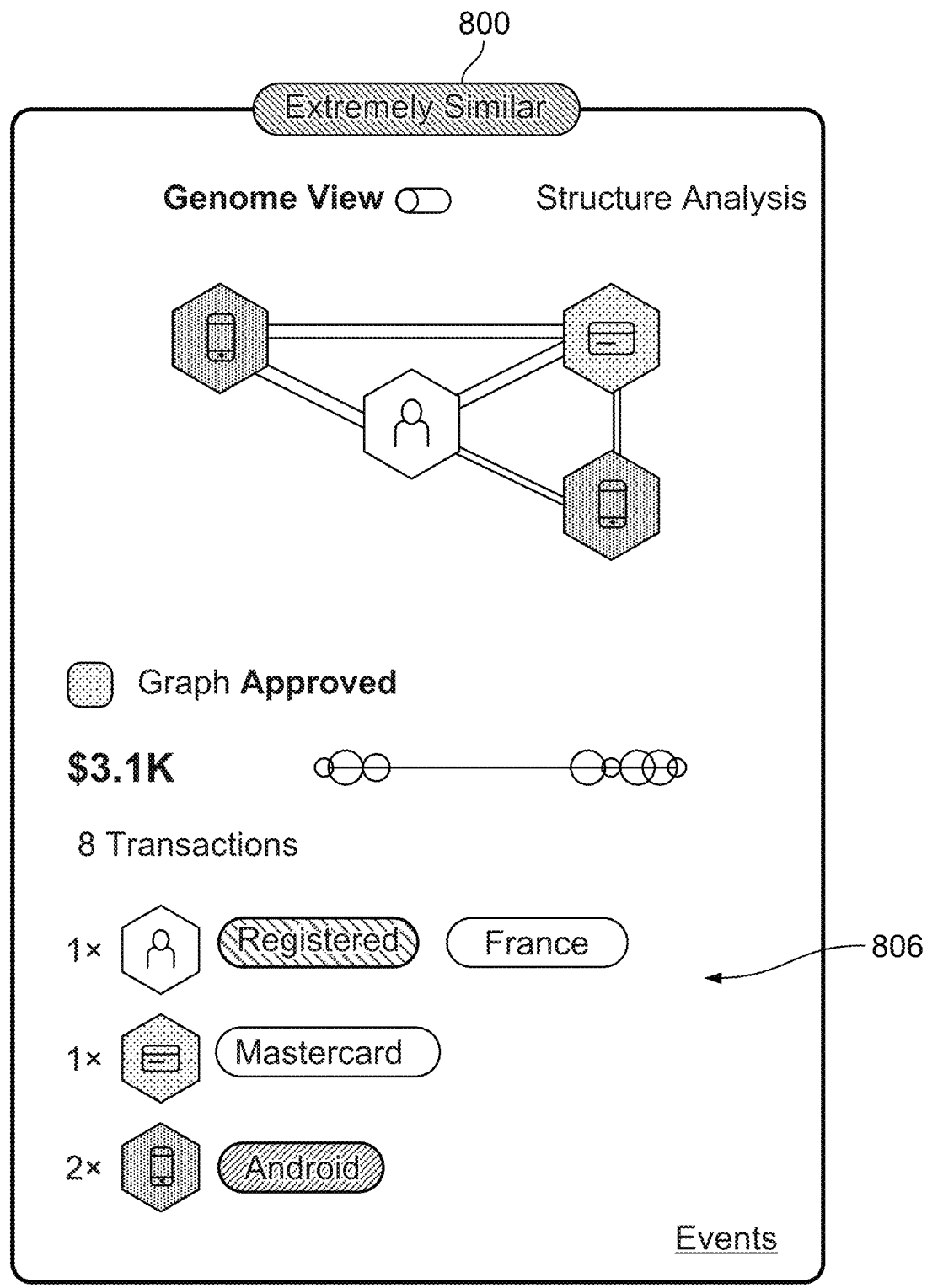
FIG. 8 shows an example of a graphical user interface for displaying a graph visualization card for a network similar to a query graph.

FIG. 8 shows an example of a graphical user interface for displaying a graph visualization card for a network similar to a query graph. As shown, the network on this card is determined by the graph visualization system to be extremely similar to a query graph (a graph being investigated by the user). In various embodiments, this card belongs to a set of cards representing the top-k similar networks as determined by the process of FIG. 5. The sections and information on this card are the same as the ones in FIG. 7 unless otherwise described.

At the top, a tag 800 indicates how similar it is to the graph in focus. In this example, the graph on this card is extremely similar to a query graph. The degree of similarity can be conveyed in a variety of ways such as a scale on the lightness of the color that is used to encode the similarity to the focus graph. This scale can be used on the color encoding of the tag 800 and is propagated to the border of the card. However, if the graph label is "in review" or "fraud," this new color encoding is overridden with the previous color encoding on the label value in various embodiments.

The bottom section of the card includes an overview of common node attributes per node type 806. Node attributes that are shared with node attributes of the query graph can be visually distinguished from node attributes that are different from node attributes of the query graph. For example, node attributes are displayed in a filled pill if they correspond to the query graph or with a border-only (outlined) pill if they differ from properties of the query graph. Referring to the example shown, "Registered" is a filled pill while "France" is a border-only pill meaning accounts are registered in both the query graph and this graph but while the query graph account is from Canada, the account in this graph is from France.

In various embodiments, a user can navigate a deck of cards for the top-k similar graphs using List View or Map View. The following figures show some examples.

Figure 9:
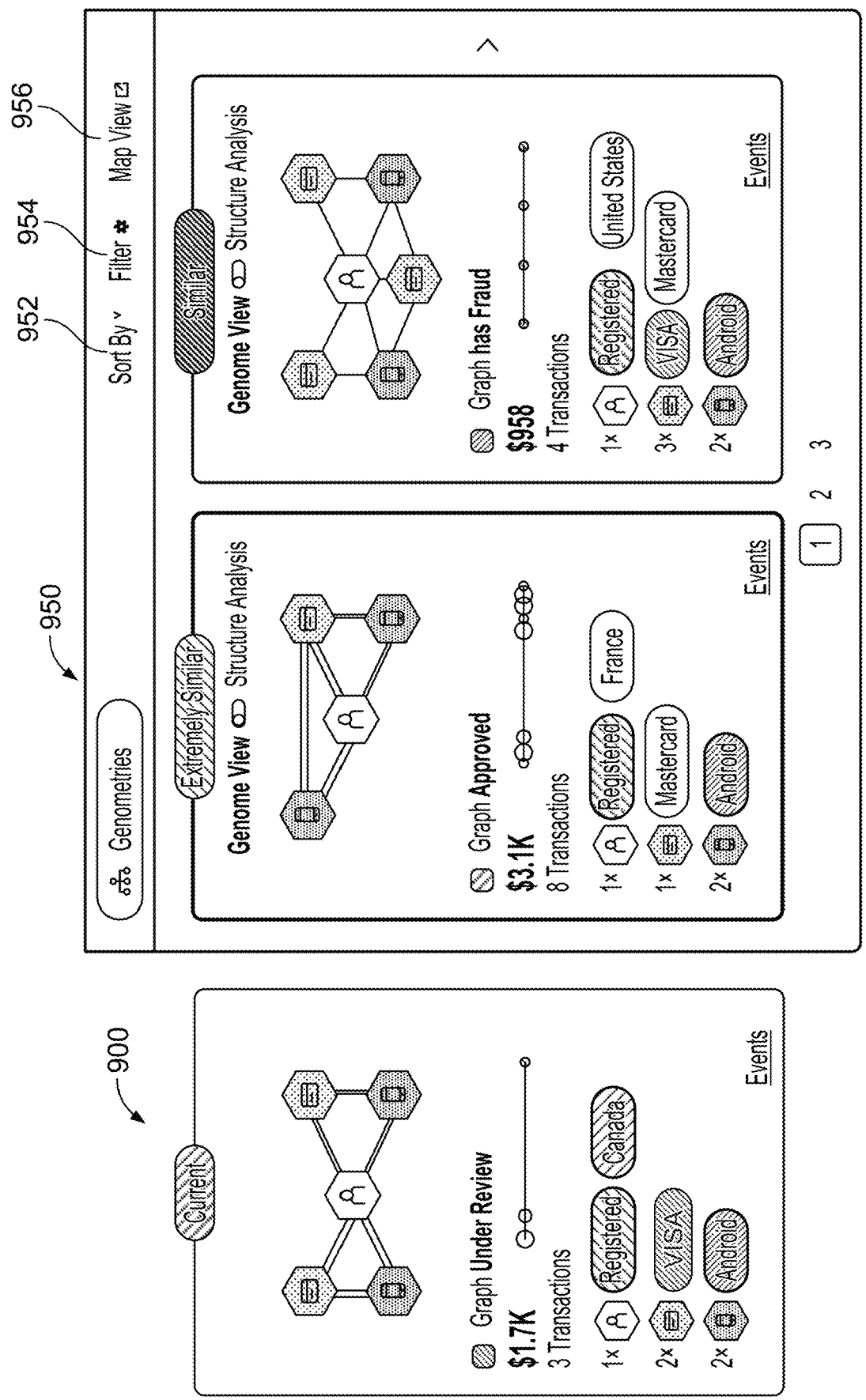
FIG. 9 shows an example of a graphical user interface displaying a List View.

FIG. 9 shows an example of a graphical user interface displaying a List View. In this interface, the card 900 of the network in focus is fixed on one portion of the user interface and a (horizontally) scrollable list of the similar graphs 950 is presented on another portion of the user interface. Here, there are 3 pages of similar graphs (e.g., 6 cards) that a user can scroll through to compare with the current graph 900. Cards in a list page are placed such that the first element of the page is positioned next to the graph in focus. This list can be sorted 952 or filtered 954 by any relevant graph information (e.g., distance to graph in focus, graph label, total amount). While the List View provides the user with a way to directly compare details between the graph in focus and some search results, an overview of all the similar graphs and how they are related between each other may be better conveyed through a Map View as shown in the following figure.

Figure 10A:
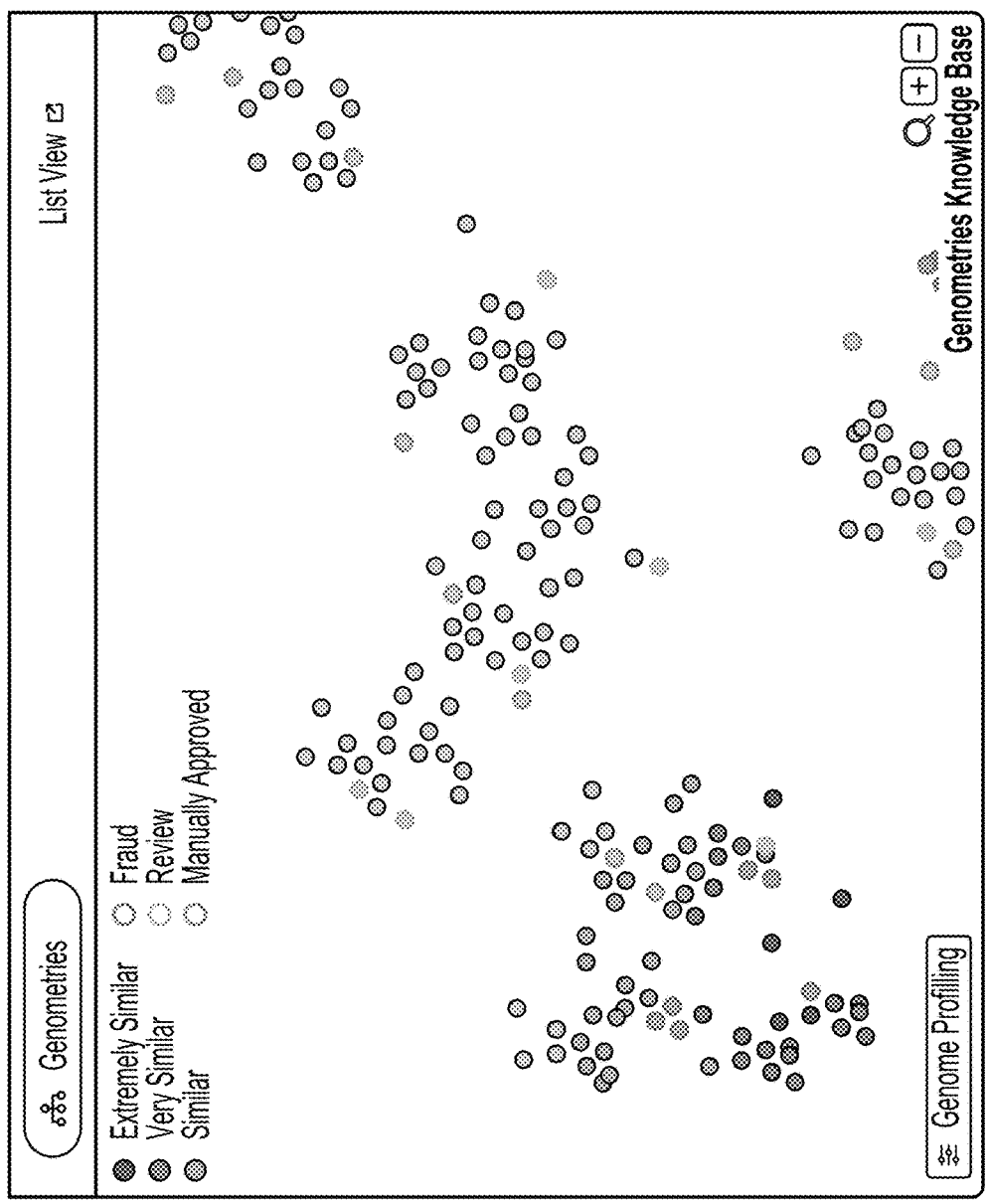
FIG. 10A shows an example of a graphical user interface displaying a map view.
Figure 10A:
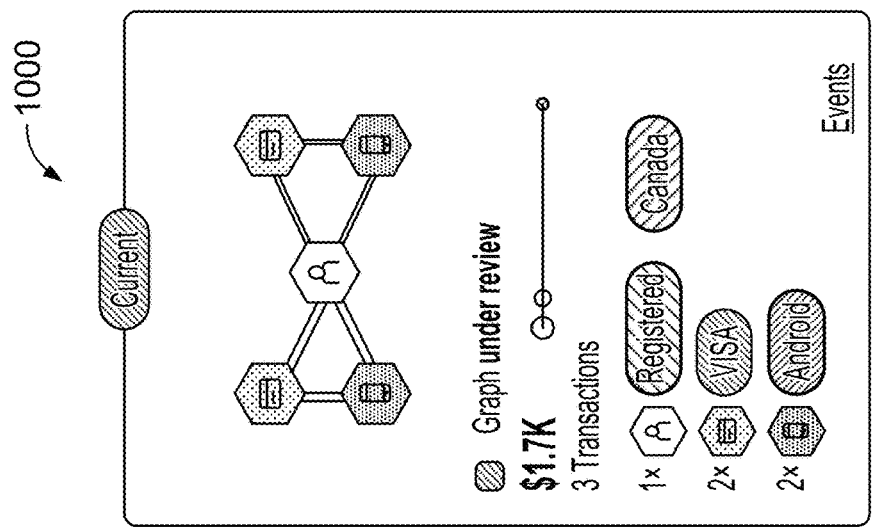

FIG. 10A shows an example of a graphical user interface displaying a map view. The card 1000 of the network in focus is fixed on one portion of the user interface and scatter plot 1050 of similar graphs is presented on another portion of the user interface. As described herein, a query graph gets assigned to its closest cluster. The Map View is built by taking the multidimensional dataset of the graph embeddings in the assigned cluster and projecting it down to two dimensions using a dimension reduction technique such as UMAP. The resulting low dimensional dataset can be plotted using a scatter plot 1050 as shown.

In this plot, a circle mark represents each similar graph in the cluster and its position along the x- and y-axis encodes the graph's values on the projected dimensions. Additional encodings on these circles can be added to display attribute-based properties of the networks. For example, each circle mark can have two color encodings, one on its fill color that encodes the distance between the corresponding graph and the focus graph, and one on its border color that encodes the corresponding graph's label. This is an example of a way to indicate the relationship (e.g., closeness) of the graph represented by the circle mark to the query graph. The scatter plot is the Map View of the cluster to which the focus graph was assigned to.

Figure 10B:
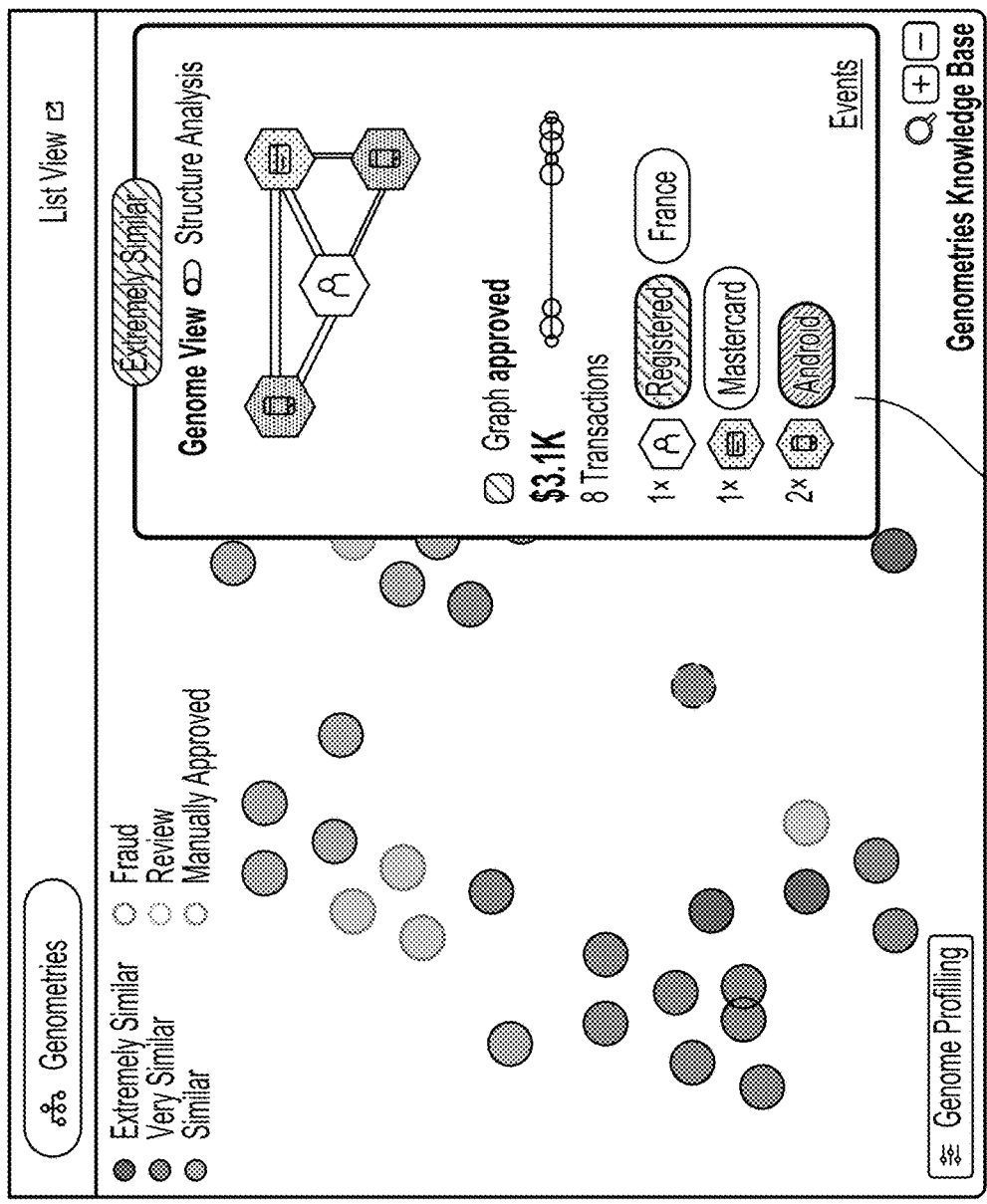
FIG. 10B shows an example of a graphical user interface in which a network is selected in map view.
Figure 10B:
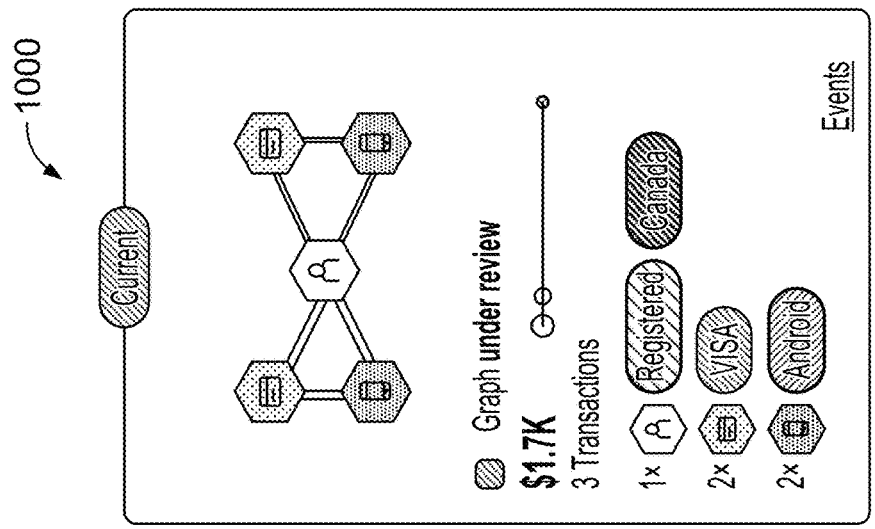

FIG. 10B shows an example of a graphical user interface in which a network is selected in map view. The scatter plot shown in this example is interactive. For example, to navigate the map, panning and zooming interactions are available. A click to select action is also possible on the circles and triggers the respective card 1060 for the selected network to be displayed (overlaid on the map), as shown.

Figure 11:
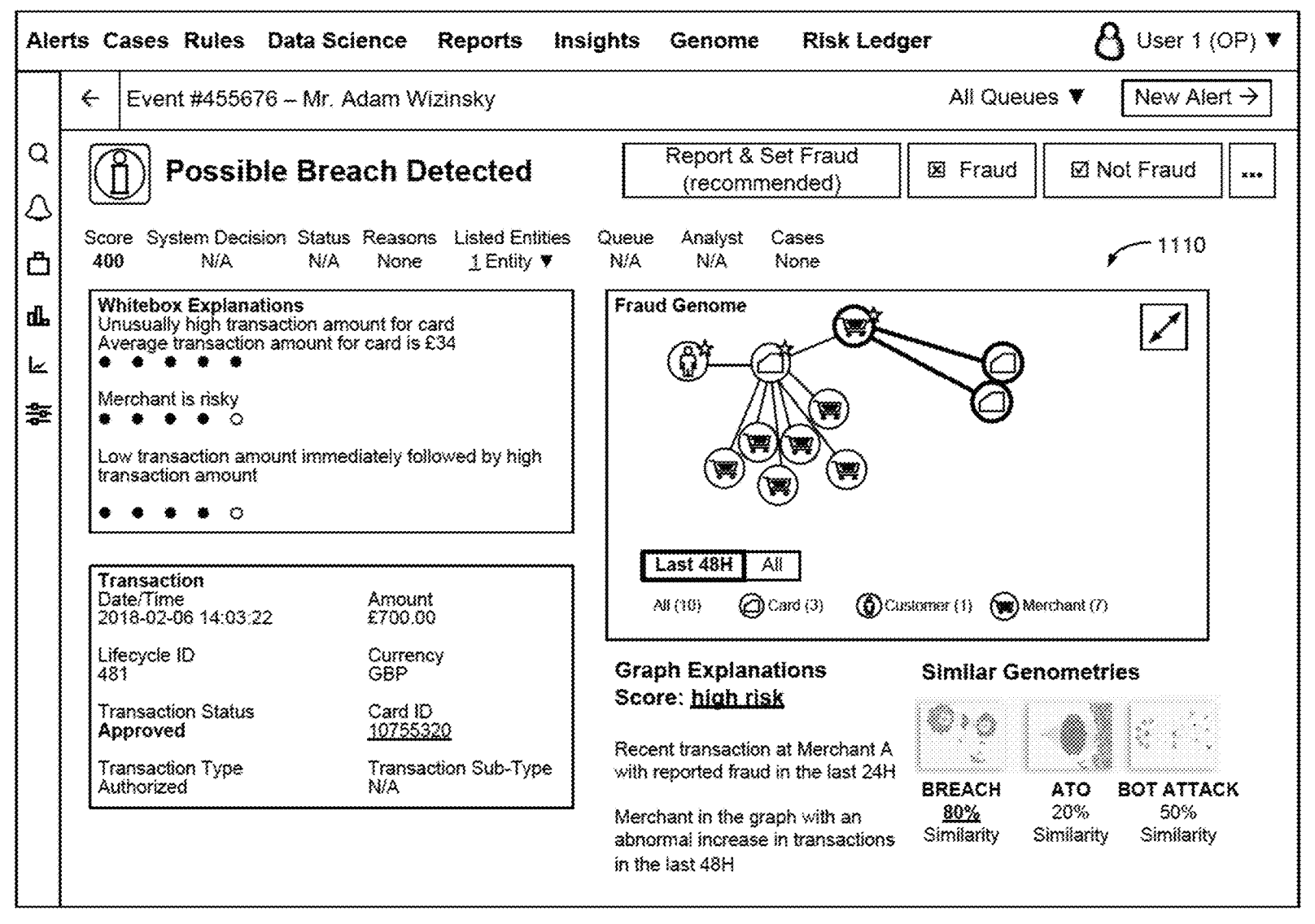

FIG. 11 shows an example of a graphical user interface for displaying graphs within a case manager tool. This graphical user interface displays graph (or portion thereof) 1110. The graph corresponds to transaction data for a specifiable time period (last 48 hours here), but the user may select another time frame such as "all" time in this example. Other options may be provided via the user interface but are not shown here. The user interface includes menus (one at the top and one at the left) to help the user navigate the information and features of the case manager. The user can select between reporting, marking as fraud, and marking as not fraud using the buttons shown. The user interface also displays whitebox explanations, transaction details, graph explanations, and similar patterns (Genometries) associated with the graph 1110. The pattern in this graph highly matches a breach, has some resemblance to a bot attack, and has relatively low resemblance to an ATO. The level of similarity is determined by comparing graph 1110 to graphs in a knowledge base using the process of FIG. 5. The information displayed here may be helpful to User 1, an L1 analyst to make fraud determinations and analysis.

FIG. 12 is a functional diagram illustrating a programmed computer system for graph search and visualization in accordance with some embodiments. Other computer system architectures and configurations can be used to perform the described graph search and visualization techniques. Computer system 1200, which includes various subsystems as described below, includes at least one microprocessor subsystem (also referred to as a processor or a central processing unit (CPU) 1202. For example, processor 1202 can be implemented by a single-chip processor or by multiple processors. In some embodiments, processor 1202 is a general purpose digital processor that controls the operation of the computer system 1200. In some embodiments, processor 1202 also includes one or more coprocessors or special purpose processors (e.g., a graphics processor, a network processor, etc.). Using instructions retrieved from memory 1210, processor 1202 controls the reception and manipulation of input data received on an input device (e.g., pointing device 1206, I/O device interface 1204), and the output and display of data on output devices (e.g., display 1218).

Processor 1202 is coupled bi-directionally with memory 1210, which can include, for example, one or more random access memories (RAM) and/or one or more read-only memories (ROM). As is well known in the art, memory 1210 can be used as a general storage area, a temporary (e.g., scratch pad) memory, and/or a cache memory. Memory 1210 can also be used to store input data and processed data, as well as to store programming instructions and data, in the form of data objects and text objects, in addition to other data and instructions for processes operating on processor 1202. Also as is well known in the art, memory 1210 typically includes basic operating instructions, program code, data, and objects used by the processor 1202 to perform its functions (e.g., programmed instructions). For example, memory 1210 can include any suitable computer readable storage media described below, depending on whether, for example, data access needs to be bi-directional or uni-directional. For example, processor 1202 can also directly and very rapidly retrieve and store frequently needed data in a cache memory included in memory 1210.

A removable mass storage device 1212 provides additional data storage capacity for the computer system 1200, and is optionally coupled either bi-directionally (read/write) or uni-directionally (read only) to processor 1202. A fixed mass storage 1220 can also, for example, provide additional data storage capacity. For example, storage devices 1212 and/or 1220 can include computer readable media such as magnetic tape, flash memory, PC-CARDS, portable mass storage devices such as hard drives (e.g., magnetic, optical, or solid state drives), holographic storage devices, and other storage devices. Mass storages 1212 and/or 1220 generally store additional programming instructions, data, and the like that typically are not in active use by the processor 1202. It will be appreciated that the information retained within mass storages 1212 and 1220 can be incorporated, if needed, in standard fashion as part of memory 1210 (e.g., RAM) as virtual memory.

In addition to providing processor 1202 access to storage subsystems, bus 1214 can be used to provide access to other subsystems and devices as well. As shown, these can include a display 1218, a network interface 1216, an input/output (I/O) device interface 1204, a pointing device 1206, as well as other subsystems and devices. For example, pointing device 1206 can include a camera, a scanner, etc.; I/O device interface 1204 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 1200. Multiple I/O device interfaces can be used in conjunction with computer system 1200. The I/O device interface can include general and customized interfaces that allow the processor 1202 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 1216 allows processor 1202 to be coupled to another computer, computer network, or telecommunications network using a network connection as shown. For example, through the network interface 1216, the processor 1202 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 1202 can be used to connect the computer system 1200 to an external network and transfer data according to standard protocols. For example, various process embodiments disclosed herein can be executed on processor 1202, or can be performed across a network such as the Internet, intranet networks, or local area networks, in conjunction with a remote processor that shares a portion of the processing. Additional mass storage devices (not shown) can also be connected to processor 1202 through network interface 1216.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 12 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 1204 and display 1218 share the touch sensitive screen component, which both detects user inputs and displays outputs to the user). In addition, bus 1214 is illustrative of any interconnection scheme serving to link the subsystems. Other computer architectures having different configurations of subsystems can also be utilized.

The graphs and other information generated by the disclosed graph search and visualization techniques are suitable for fraud analysts of various skill levels. For example, level 1 (L1) analysts review transactions/cases and decide whether they are fraudulent or legitimate. Thus, one of their goals is to focus on individual events or cases to make a decision as quickly and accurately as possible. An L1 analyst can use the disclosed graph search and visualization system as an aid to decide whether an alerted transaction/case is fraudulent or legitimate. Particularly, when an analyst is reviewing an alert, he'll see the graph associated with the alert and its closest graphs from historical data. Because the system is able to show similar patterns that happened in the past, which have already been labelled as legitimate or fraudulent, the analyst can use the known label to help in the decision of the alert under analysis.

As another example, a level 2 (L2) analyst is responsible for analyzing and reporting on major fraud trends and for investigating bigger schemes. Thus, one of their goals is to analyze a potentially big set of transactions/cases and extract useful insights to tune the fraud prevention system accordingly (e.g., build new rules). An L2 analyst can use the disclosed graph search and visualization system to perform similarity queries on graphs and to investigate fraudulent patterns. Furthermore, within an investigation, if the analyst discovers a particular graph pattern that he finds interesting, he can further explore it by querying for similar graphs in the historical data and extracting information about the fraud frequency and other characteristics of that graph pattern.

What is claimed is:

1. A system, comprising:
   one or more processors configured to:
      receive data, wherein the data includes transaction data entries;
      generate one or more graphs using the received data;
      calculate one or more vectors for the one or more graphs, wherein each of the one or more vectors represents a respective graph embedding corresponding to at least a portion of the one or more graphs, wherein the calculated one or more vectors are aggregated with one or more previously determined graph embeddings corresponding to previous transaction data entries;

determine that the one or more vectors belongs to at least one group of vectors based at least on the one or more vectors matching a data pattern associated with the at least one group of vectors including by building a hierarchy of clusters based at least on the aggregated one or more vectors with the one or more previously determined graph embeddings; and identify a representative graph for each of the at least one group of vectors; and a memory coupled to at least one of the one or more processors and configured to store the at least one group of vectors and a respective identified representative graph.

2. The system of claim 1, wherein the one or more processors are configured to calculate the one or more vectors including by being configured to calculate the one or more vectors for the one or more graphs, each vector including a component that is a percentage of nodes of each node type in a corresponding graph.

3. The system of claim 1, wherein the one or more processors are configured to calculate the one or more vectors including by being configured to perform unsupervised learning to calculate the one or more vectors for the one or more graphs, each vector including a first component that is a unique descriptor of a corresponding graph based on a topology of the corresponding graph and a second component that is a percentage of nodes of each node type in the corresponding graph.

4. The system of claim 1, wherein building the hierarchy of clusters includes using successively aggregating learned node representations into clusters to obtain a single representation of each of the one or more graphs.

5. The system of claim 1, wherein the one or more processors are configured to group the one or more vectors into the at least one group of vectors and to identify the representative graph for each of the at least one group of vectors including by being configured to use a clustering model.

6. The system of claim 5, wherein at least one of model performance metrics and model diagnosis analysis is determined for the clustering model.

7. The system of claim 6, wherein the clustering model is tuned in response to user input in response to the model performance metrics and the model diagnosis analysis.

8. The system of claim 1, wherein:
the one or more processors are configured to update the at least one group of vectors including by:
receiving new data, wherein the new data includes transaction data entries;
generating one or more new graphs using the received new data;
calculating one or more new vectors for the one or more new graphs, wherein the one or more new vectors each identifies a corresponding portion of the one or more new graphs; and updating the at least one group of vectors based on the calculation of the one or more new vectors; and
the memory is configured to store the updated at least one group of vectors.

9. The system of claim 1, wherein the calculated one or more vectors includes a list of vectors corresponding to a set of data smaller than the received data.

10. The system of claim 1, wherein:
at least one of the one or more graphs is represented by at least a subset of the calculated one or more vectors; and
the number of vectors in the at least a subset of the calculated one or more vectors is smaller than the number of transaction data entries.

11. A method, comprising:
receiving data, wherein the data includes transaction data entries;
generating one or more graphs using the received data;
calculating one or more vectors for the one or more graphs, wherein each of the one or more vectors represents a respective graph embedding corresponding to at least a portion of the one or more graphs, wherein the calculated one or more vectors are aggregated with one or more previously determined graph embeddings corresponding to previous transaction data entries;
determining that the one or more vectors belongs to at least one group of vectors based at least on the one or more vectors matching a data pattern associated with the at least one group of vectors including by building a hierarchy of clusters based at least on the aggregated one or more vectors with the one or more previously determined graph embeddings; and
identifying a representative graph for each of the at least one group of vectors.

12. A computer program product embodied in a non-transitory computer readable medium and comprising computer instructions for:
receiving data, wherein the data includes transaction data entries;
generating one or more graphs using the received data;
calculating one or more vectors for the one or more graphs, wherein each of the one or more vectors represents a respective graph embedding corresponding to at least a portion of the one or more graphs, wherein the calculated one or more vectors are aggregated with one or more previously determined graph embeddings corresponding to previous transaction data entries;
determining that the one or more vectors belongs to at least one group of vectors based at least on the one or more vectors matching a data pattern associated with the at least one group of vectors including by building a hierarchy of clusters based at least on the aggregated one or more vectors with the one or more previously determined graph embeddings; and
identifying a representative graph for each of the at least one group of vectors.

* * * * *